United States Patent [19]

Manto

[11] Patent Number: 4,527,262
[45] Date of Patent: Jul. 2, 1985

[54] INFORMATION STORER AND RETRIEVER

[75] Inventor: Charles L. Manto, Chicago, Ill.

[73] Assignee: Manto Incorporated, Palatine, Ill.

[21] Appl. No.: 402,640

[22] Filed: Jul. 28, 1982

[51] Int. Cl.³ .............................................. G11B 17/22
[52] U.S. Cl. ........................................ 369/33; 369/34; 369/38; 369/39
[58] Field of Search ....................... 369/33, 34, 38, 39

[56] References Cited

U.S. PATENT DOCUMENTS

| | | | |
|---|---|---|---|
| 1,595,241 | 8/1926 | Nelson . | |
| 1,981,175 | 11/1934 | Horn | 274/10 |
| 2,189,077 | 2/1940 | Maurer | 274/10 |
| 2,690,913 | 10/1954 | Rabinow | 274/10 |
| 2,800,642 | 7/1957 | May | 340/174 |
| 2,852,761 | 9/1958 | Hagopian | 340/174 |
| 2,946,594 | 7/1960 | Staar | 274/10 |
| 3,080,551 | 3/1963 | Rogal | 340/174.1 |
| 4,019,204 | 4/1977 | Griffiths et al. | 360/99 |
| 4,040,107 | 8/1977 | Bryer | 360/99 |
| 4,127,882 | 11/1978 | Kohl et al. | 360/98 |
| 4,170,031 | 10/1979 | Beuch et al. | 360/98 |
| 4,195,321 | 3/1980 | Chelin et al. | 360/98 |
| 4,226,570 | 10/1980 | Holecek et al. | 414/751 |
| 4,245,266 | 1/1981 | Bauer | 360/99 |
| 4,271,489 | 6/1981 | Siryj | 369/38 |

FOREIGN PATENT DOCUMENTS 2062935  5/1981  United Kingdom ............ 369/34

OTHER PUBLICATIONS de Vos, *Megadoc, a Modular System for Electronic Document Handling*, Philips Technical Review, vol. 39, #12, 1980.

Bowdle, *Data Processing System*, IBM Technical Disclosure Bulletin, vol. 3 #5, Oct. 1960. pp. 24-25.

*Primary Examiner*—Steven L. Stephan
*Attorney, Agent, or Firm*—Fitch, Even, Tabin & Flannery

[57] ABSTRACT

Apparatus is provided for randomly accessing and storing the total mass information storage media of a computer or microprocessor system, in particular computer mass storage media, such as floppy and hard disks, disk cartridges, tapes, video disks and magnetic bubble memories.

37 Claims, 24 Drawing Figures

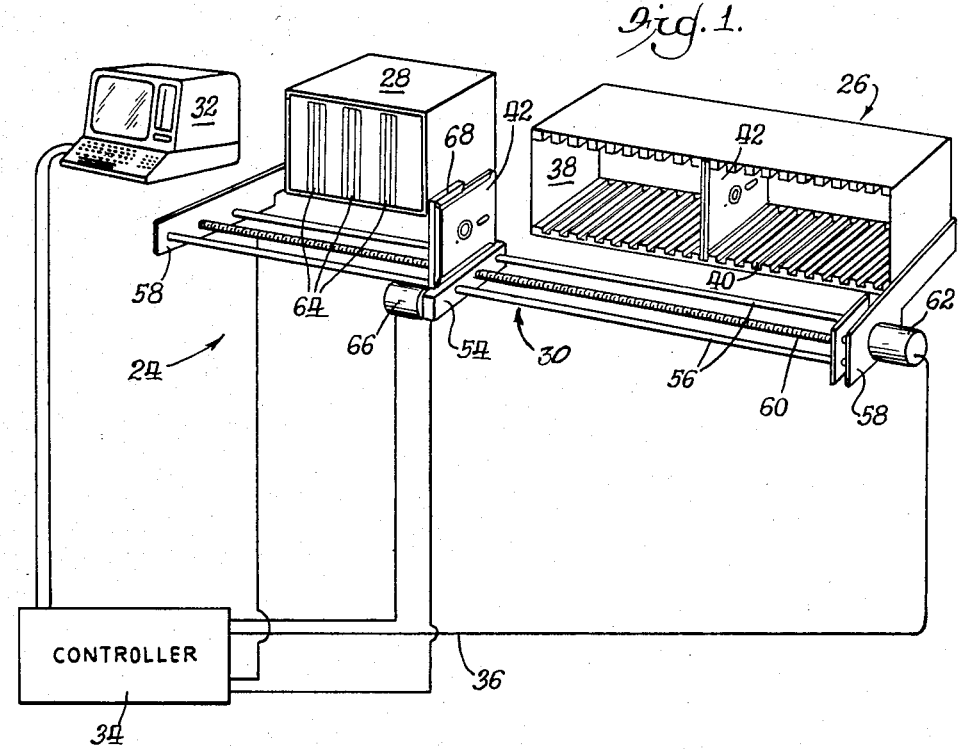
Fig. 1.
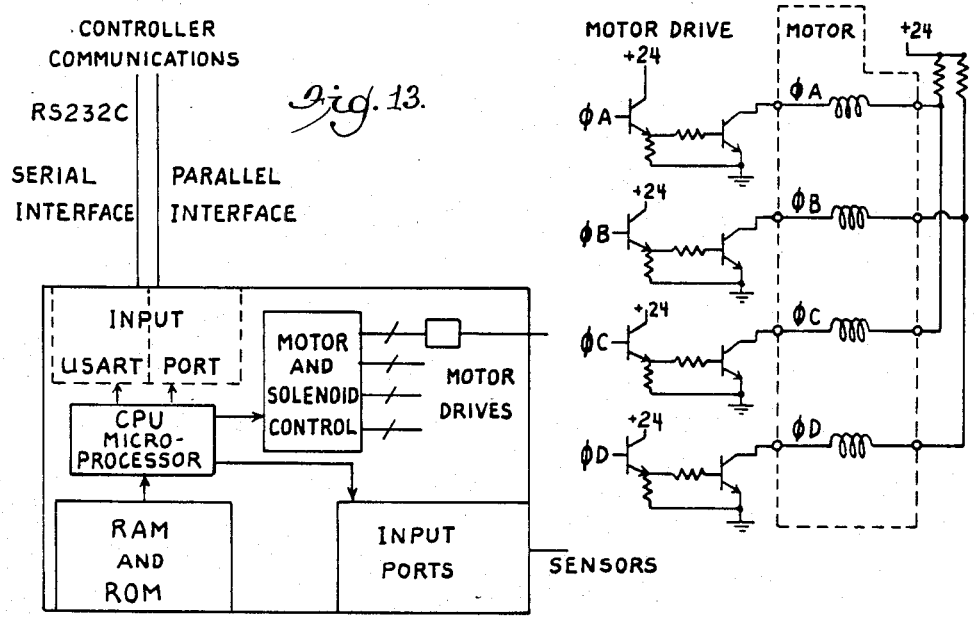
Fig. 13.
Fig. 14.

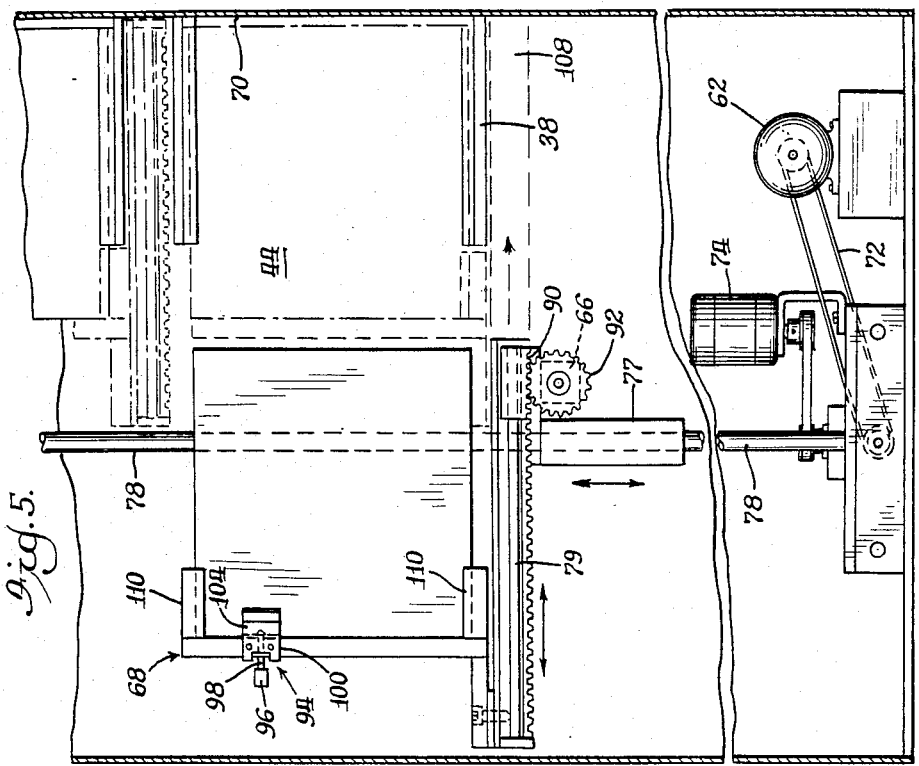
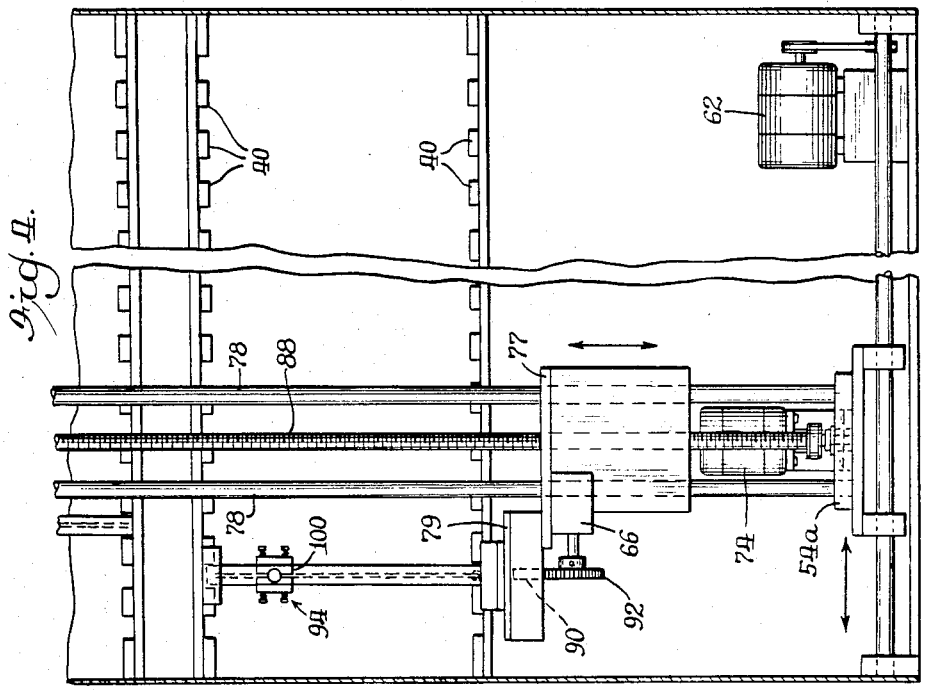

Fig.6. Fig.7. Fig.8.
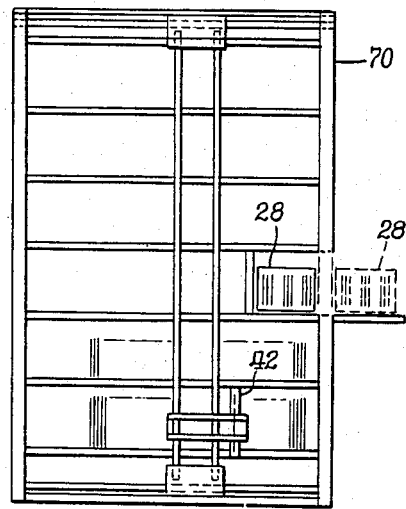
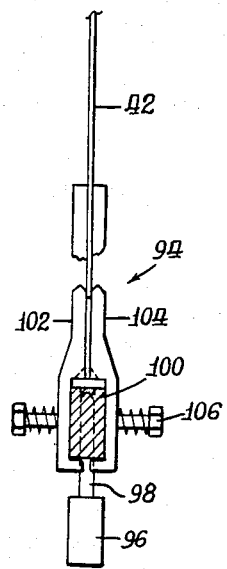
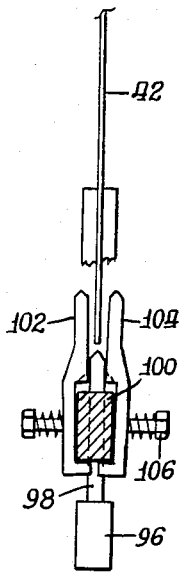
Fig.9.
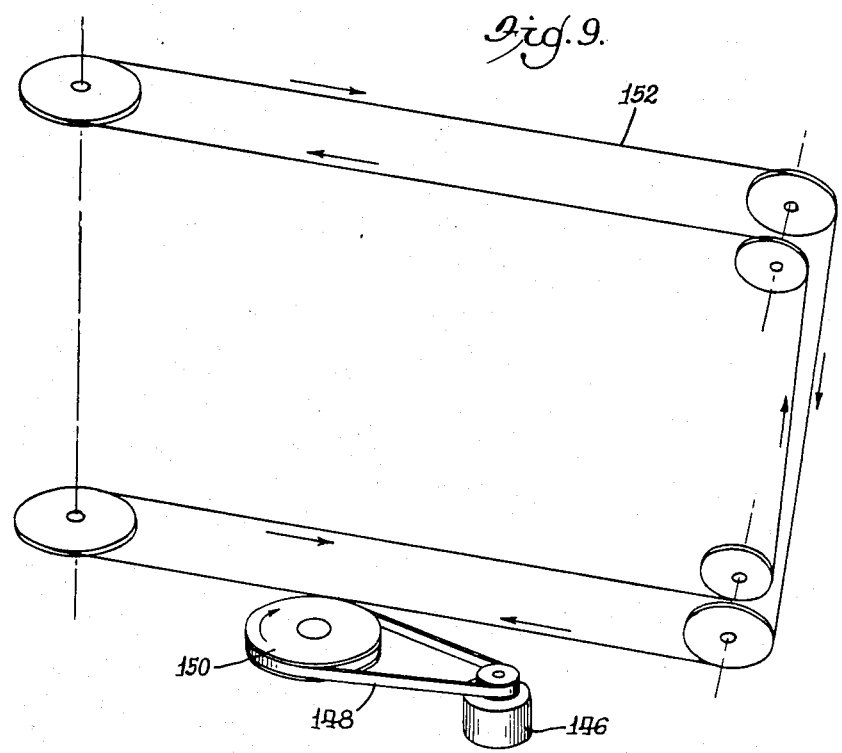

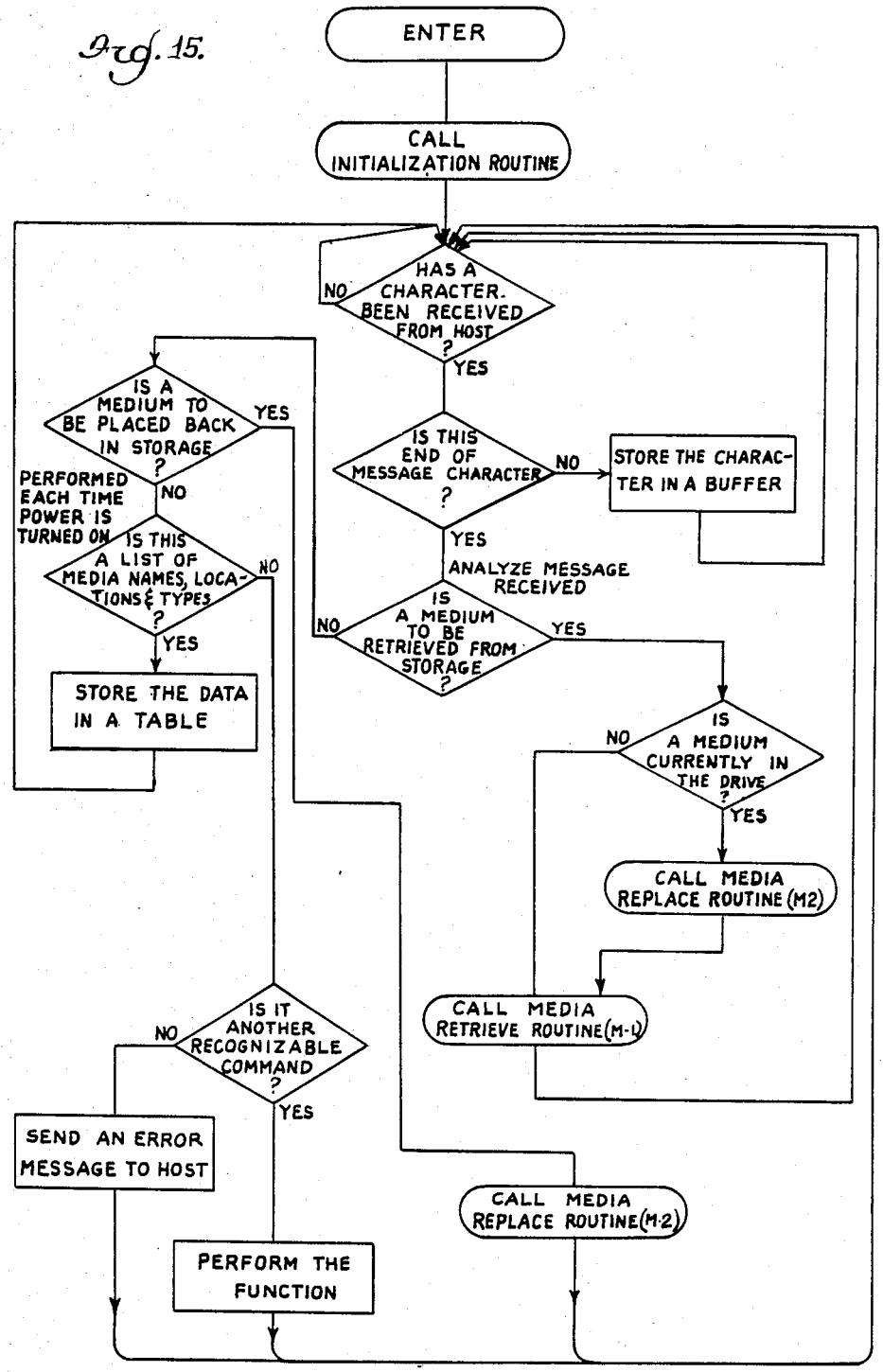

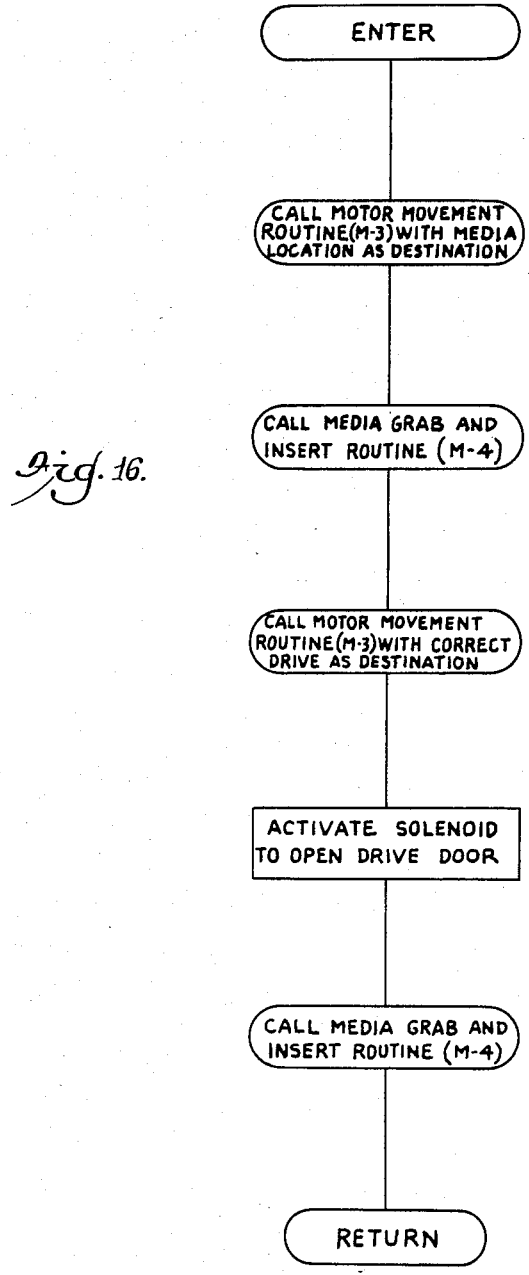

MEDIA REPLACE ROUTINE (M-2)
(MOVES MEDIA FROM DRIVE BACK INTO STORAGE)

MOTOR MOVEMENT ROUTINE (M-3)

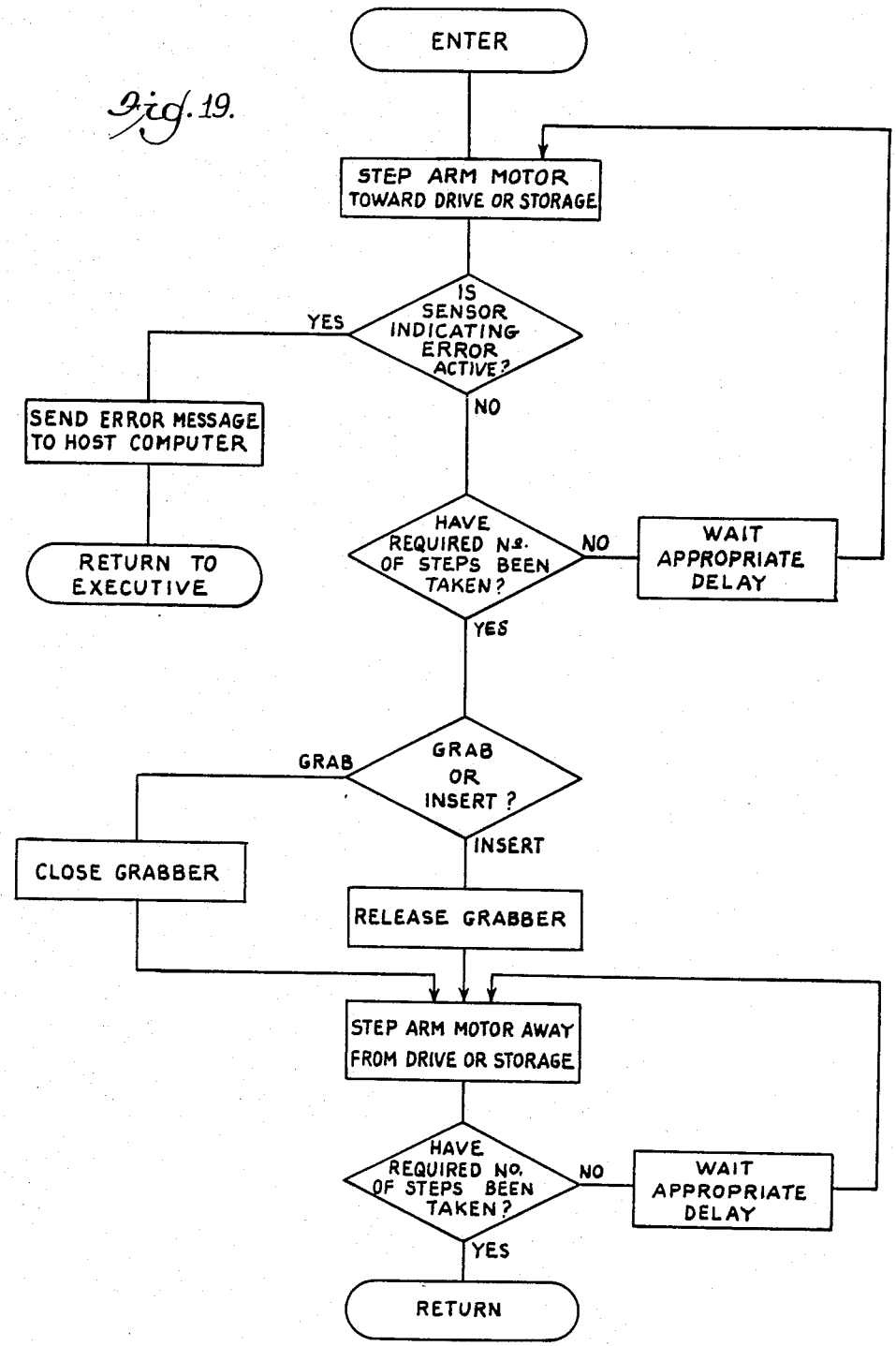

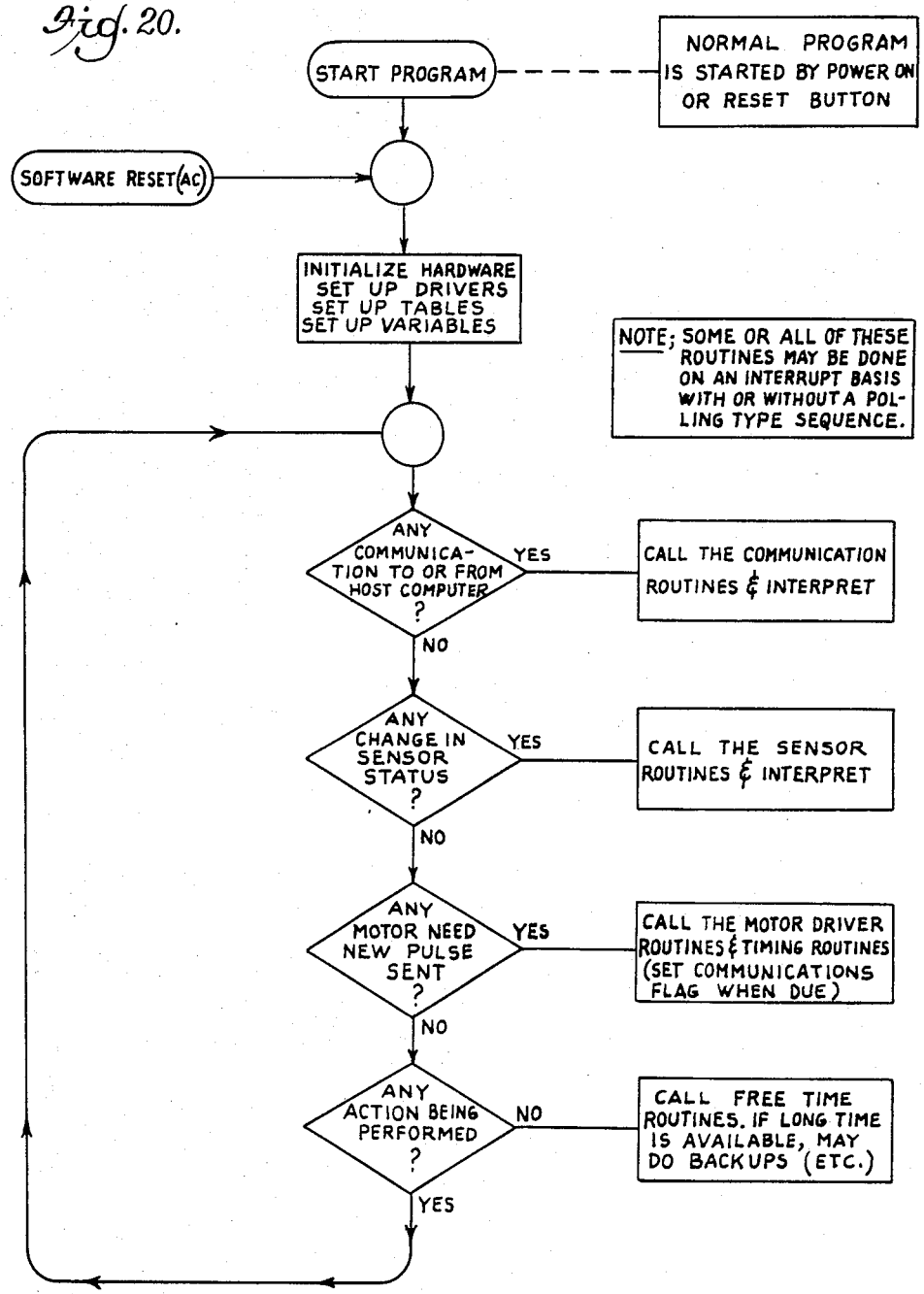

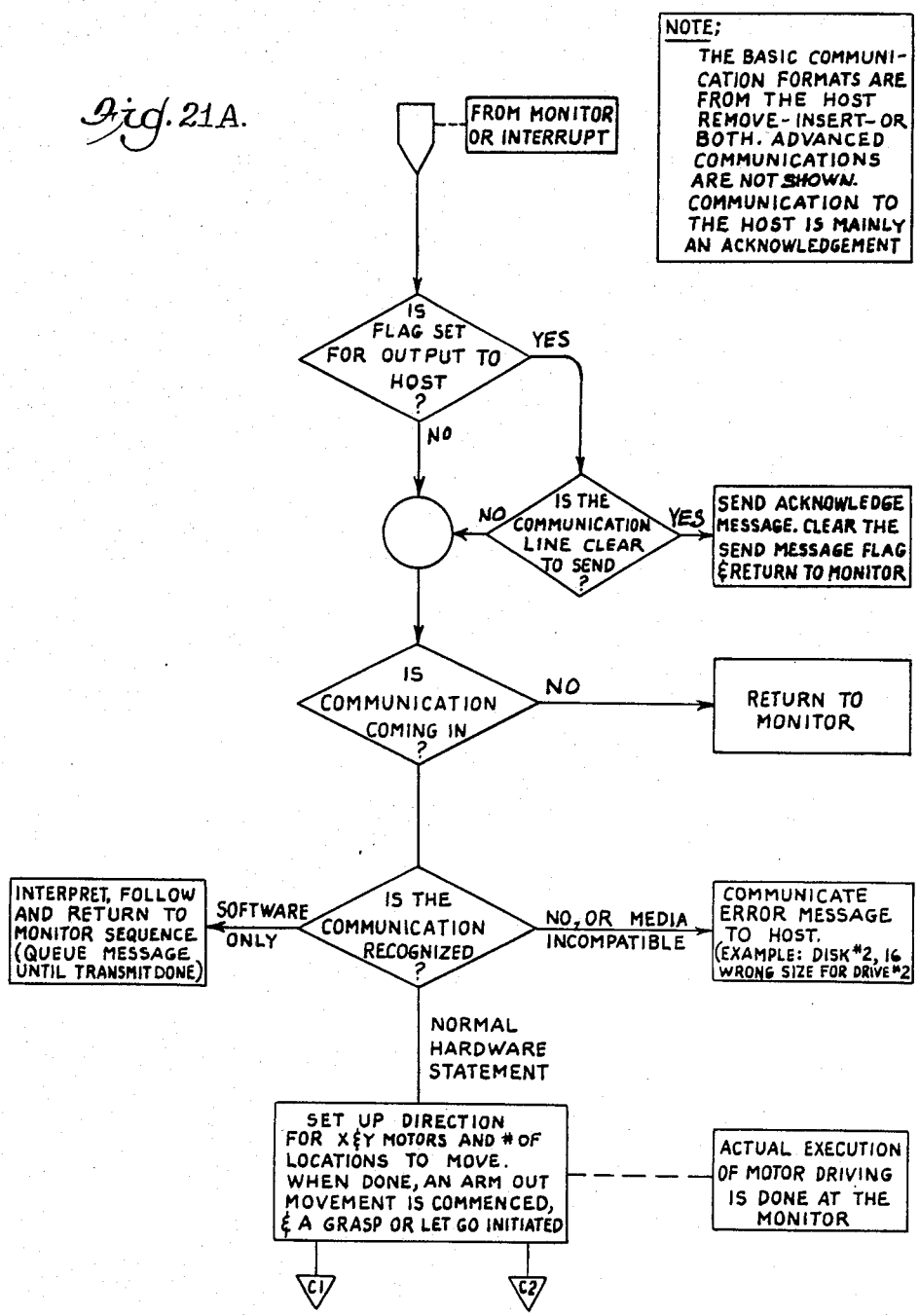

COMMUNICATION ROUTINES

INFORMATION STORER AND RETRIEVER

This application relates to dynamic information storage and retrieval, and more particularly relates to a system for the random selective addressing of storage media.

It is a familar experience that programmed access, for example in a juke box, provides a system and means for selecting and retrieving information stored on a disk (phonorecord). U.S. Pat. No. 2,946,594 to Staar discloses a juke box which selectively can access and play any record positioned in a rack or magazine, the magazine being limited to the physical capacity of the device. In this instance, a carriage moves a playing device in front of the magazine and transfers the selected disk to the playing device. Afterwards, the disk is returned to the magazine, and the carriage is free to move the player device to another location for another disk selection. The complexity involved in moving the playing device would appear to restrict the shape and capacity of the whole apparatus.

Many storage and selection systems are directed to storage media in the form of magnetic films. For example, U.S. Pat. No. 4,127,882 to Kohl, et al. discloses a changeover mechanism for disk-shaped recording media, especially for magnetic films in a sleeve, and provides a magazine having selector, transport and drive mechanisms. The magazine in turn provides any desired access to a particular recording medium. The mechanism is particularly useful for floppy-disks, but is generally useful for any type of film-like or rigid recording media. In this device, the entire magazine containing the disks moves and positions a selected disk in front of a reeiving slot. The disk is then inserted into the receiving slot, after which it is returned to the magazine. Because the entire storage magazine is transported, however, the total storage capacity would be thereby limited to that which can be readily transported on the mechanism.

Magnetic disks exist in both rigid and non-rigid, or "floppy" versions. The rigid disks are, for example, very precisely machined aluminum platters, generally 0.075 inch thick and coated with a magnetic medium. They are typically manufactured in 14, 8, and 5¼ inch diameters. Floppy-disks are thin plastic sheets, also magnetically coated, and they exist typically in 8, 5¼ and 3 inch diameters.

Floppy-disk drives generally use open-loop, stepper motor driven positioning mechanisms which may trade performance for lower costs. A commonly used mechanism in the past has been a lead screw. This converted the rotation of the stepper motor into linear motion of a carriage carrying the magnetic heads. More recent designs use taut metal band drives to convert from rotary to linear motion.

Winchester is a name given to a rigid disk technology using very low mass magnetic heads. These heads usually are gimballed from the carriage mechanism by thin metal flexures and are biased towards the recording surface by a spring load of approximately 10 grams. The heads contain aerodynamic surfaces which form an air bearing on the order of 20 microinches thick.

Thus, various forms of storage and retrieval systems are known, but the practical storage capacity of known systems is limited. For example, in systems relying on storage media in the form of plastic disks, a single disk has a relatively small memory capacity, and so to store large amounts of data, many disks are required. These disks have to be endlessly cataloged, filed, retrieved, inserted, and removed from the transducer or disk drive individually, and a transport mechanism is needed. Heretofore, this has resulted in a cumbersome method of storage and has severely impaired the efficiency of microcomputers for many applications.

Like the floppy-disk drive, the Winchester stores data in the form of magnetic traces on a rotating disk. Both drives read and write the encoded data, just as an audio turntable picks up the sounds stored on a phonograph record. Rather than plastic, however, as mentioned above the Winchester employs metal disks, highly polished aluminum with a thin coating of iron oxide. Because aluminum does not expand or contract in response to atmospheric changes as much as Mylar does, Winchester disks can hold more tracks, for example up to 350 or so per inch. A simple Winchester disk will store about 2.5 million bytes, or roughly 1,250 type written pages. Drives are available for containing, for example, four disks. The Winchester drive is also faster, because it avoids wear and tear on the disk by floating the head on a cushion of air, a few ten thousandths of an inch above the disk's surface. Such operation, however, requires a sealed, airtight compartment in which air is continually recycled through a filter while the drive is in motion to ward off particles of dust that might lodge under the head and cause a disastrous loss of memory.

Rigid disk drives are historically higher in performance, higher in reliability, and higher in cost then floppy-disk drives. This is due in part both to the characteristics of the recording technologies and the designs of the actuating mechanisms.

Disk cartridges are among new technologies in the field and provide high performance and reliability in removable disk drives. Such provide resistance to shock, vibration and contamination. Disk cartridges combine the advantages of both the floppy-disk and rigid disk drives.

No matter what drive and storage medium is used in any given installation, use of the system invariably places demands on mass storage that soon exceed the available capacity of the system. Often these demands are not foreseen when the system is initially planned. For example, photographically entered material, such as video digitization, graphics applications and artwork, voice storage, and word processing inherently require large amounts of memory. Decisions may be made to store or archive the material, which rapidly reduces available mass storage memory in a given system. When the available capacity is exhausted, the need arises to expand the system. Whether the system already includes a mixture of floppy and rigid disks or whether the system is expanded by creating such a mixture, the problem to be solved is how to obtain increased mass storage capacity in an economical manner. Further, the known mass storage memory is provided on disks that are separately stored and manually retrieved and placed in an appropriate drive. The manual handling of the disks is not only burdensome, in some instances it may prevent certain usage of the computer system. For example, anyone wanting to use the computer from a remote location is not in a position to manually locate, retrieve, and load into the appropriate drive, a disk having the needed stored information at the central location.

It is understood that in any system, a greater memory capacity will also accommodate a form of increasingly sophisticated programming for data-base management. These programs make it possible for a computer to sift and sort information in the memory, providing an invaluable collection of information available for immediate call up.

Accordingly, there exists a need in the marketplace for an automatic, random storage and retrieval system having greatly enlarged mass storage capacity with minimum volume (space) requirement while at the same time having enhanced capability of cataloging, filing, retrieving, inserting and removing, the media from the drive. Furthermore, it is desirable to provide for the access and retrieval of different types of removable media within the same system or installation. In this connection, the media may be different in dimension, weight, shape, material composition, method of recording and of formating memory on the medium. It is an object of this invention to provide such a system, whether for use in storage media such as record collections or for use in magnetic storage media, either rigid or floppy-disk, or for use in laser disks or non-magnetic, non-optical systems. It is conceivable, furthermore, that such a system as disclosed herein will also be useful in cassette storage and retrieval, whether video or audio, or both, and will provide for the random and continual access to any and all disks in the system without the presence of an operator to manually locate, insert and replace the disks. Such a system also offers a solution to compatibility problems among different types of media and different formats in the system. For example, an 8 inch floppy-disk can be formated in different routines, and in this system any number of such format routines can be automatically recalled so that the same 8 inch drive could be used to read any of the differently formated disks. Also, the system can be configured to handle a mix of different sized floppy-disks; of different types of magnetic media, such as floppy-disks, flexible disk cartridges, and hard disk cartridges; and of different types of non-magnetic media.

Other objects of the invention will become apparent and the invention readily understood from the following description read in connection with the accompanying drawings in which:

FIG. 1 is a schematic of a system in accordance with this invention comprising the basic elements to illustrate operation of the system;

FIG. 4 is a front view in elevation and partly in section of a portion of the apparatus of FIG. 2 illustrating certain elements in larger scale;

FIG. 5 is an end view in elevation and partly in section of a portion of the apparatus of FIG. 2 illustrating certain elements in larger scale;

FIG. 6 is a front view without the front cover of the apparatus of FIG. 2 illustrating an interface with a transducer;

FIG. 7 is a fragmented top view of a gripper in the closed position used in the system in accordance with the invention;

FIG. 8 is a fragmented top view of the gripper of FIG. 7 in the open position;

FIG. 9 is a schematic illustrating an alternative transport for the system in accordance with the invention;

FIG. 13 is a schematic in block diagram form of a controller for the system of FIG. 1;

FIG. 14 is an electrical schematic diagram of a motor drive useful in the controller of FIG. 13;

FIG. 15 is a flow chart of an executive program for use in the system in accordance with the invention;

FIG. 16 is a flow chart of a media retrieve routine for use in the program of FIG. 15;

FIG. 19 is a flow chart of a media grab and insert routine for use in the program of FIG. 15;

FIG. 20 is a flow chart of an alternative executive program useful in this invention; and FIG. 21A is a flow chart of communication routines useful in the program of FIG. 20.

Figure 2:
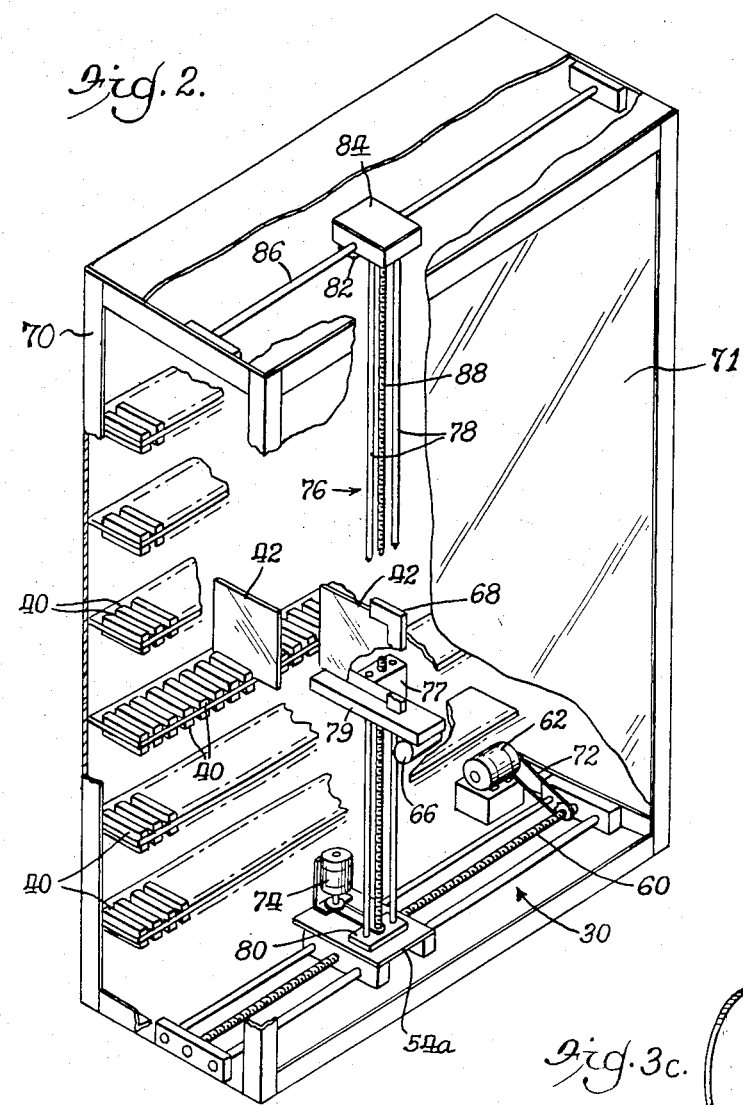
FIG. 2 is a perspective view of apparatus illustrating three-axis operation of the system in accordance with the invention.

Generally, the invention includes a storage and retrieval system for information, whereby storage media are transported to a transducer mechanism such as is utilized for magnetic tape, floppy-disk, hard disk, laser disk, or other mass storage device. After the transducer has completed its use of a particular storage medium, the medium is returned to the storage area from which it came and then another unit is retrieved, transported to, and placed in, the transducer.

The particular storage medium is shown in the form of a floppy-disk for purposes of illustrating and describing the invention. The transducer mechanism, therefore, is a floppy-disk drive, and the transport mechanism includes an arm capable of holding a disk, and this arm may translate or rotate, or both, by being motor driven, toward and away from the storage area. As more fully described hereinafter, this transport mechanism may be in the form of a rack and gear device for translation of the storage media. Another form illustrated utilizes a lead screw for translating the storage media, and still further forms for either translation or rotation may utilize a belt or a chain drive arrangement.

Although an illustrated embodiment of the system of this invention is provided for the access and retrieval of storage media in the form of floppy-disks, the system is by no means limited to floppy-disks. It is convenient for illustrative and descriptive purposes for simplicity and ease of understanding, however, to completely disclose the invention as it relates to only one particular storage medium. It should be understood, therefore, that the system of the invention is also useful for other storage media of the kind described in the introduction hereof.

The floppy-disks are arranged in at least one row in a storage means, such as a rack or shelf. The disks are accessed by one or more arms of a transport mechanism which moves along the rows of the disks driven preferably by a driving means, such as a stepper motor, along a shaft or axis, which extends parallel to the rows of disks. The transport moves in order to access any disk stored anywhere along anyone of the rows of disks. The arm extends to grasp a disk, retracts while grasping the disk to remove the disk from its storage position, transports the disk to a disk drive or staging area, and extends to load the disk into the drive or staging area. The arm reverses these steps in order, along with the transport mechanism, to replace the disk in its location in the storage area or to access the next disk which would be placed in a second drive or staging area. The arm and transport mechanism are controlled by a controller which can be interfaced to any device which serves either as input or output or both, such as a computer, a microprocessor, a keyboard, a terminal, a controller or other similar mass storage device, which device controls the controller either from a command from an operator or automatically from a program.

The schematic of FIG. 1, for ease of illustration, shows only one row of disks to conceptually and functionally illustrate the invention without a morass of intricate details. The expanded form, thereafter, is more easily illustrated and described. Further, the drive may be either associated with the host computer or provided as a part of the invention.

When multiple rows of disks are being accessed, the rows may be arranged over one another in bookshelf fashion. This has particular advantage where the ultimate use requires maximum economical usage of floor space. The arrangement also may be of the multiple rows in parallel with one another having a central corrider for the disks to be delivered. In such instance, the rows are arranged around the central corrider so that the end view appears in polygonal configuration. This is particularly appropriate where the ultimate use requires maximum economical usage of the cubic space and maximum economical usage of travel time. The rows may also be short and stacked on top of one another to take advantage of narrow but high available space, as between two desks or work areas.

In the bookshelf arrangement, the transport moves about in a multiple axis arrangement, i.e., up and down, in and out, and end to end. In the polygonal arrangement, the arm or arms must move in a radial fashion to access any of the rows it faces in its various positions along the central corrider after being moved there by the transport mechanism.

There is provided a link between a host computer and a controlling processor which allows a program to automatically select or allow the operator to select the desired floppy-disk via the host computer's normal entry device, for example a CRT.

The method of the system includes several distinct mechanical functions. For example, mechanical functions include the insertion and retrieval of the storage media from the storage area; the translation, or rotation, or both, of the storage media from the storage area to the transduction area; and the insertion and retrieval of the storage media from the transduction area.

In the transport mechanism as illustrated herein, the need for accurate position control is manifest. Although specialized applications requiring accurate position control are rampant in this day of automation, each application is different in some way, either in actuator, resolution, speed, mass dynamics or machine controller interface. Consideration has been given herein of utilizing a servo mechanism, more commonly referred to as a "servo" or "servosystem". Generally, a servo mechanism is a closed looped system for the purpose of obtaining a high degree of control, repeatability and accuracy in the face of variations in contamination, load, temperature and other factors. Two basic types of servo controls have proven quite useful in industrial applications, namely, the velocity servo and the position servo. Quite generally, of course, the problem is to simply move something from here to there. During motion, the general consideration is a velocity servo mechanism. Whereas to stop the transport mechanism at a predetermined position, general consideration is given to a position servo mechanism. Such mechanisms, of course, have need for separate feedback elements.

It has been found desirable to substitute a stepper motor for the servo devices. Thus, as hereinafter described, a stepping motor is utilized to drive the various components of the transport mechanisms. The stepping motor may be directly coupled to a lead screw which drives an arm assembly, for example, in the desired directions.

Although servo circuits could be used, stepping motors have been used and will be described herein for two principal characteristics: the stepping motor has a large holding torque when its rotation is complete because of the energized state of two sets of coils at the end of rotation, and the stepping motor is easy to control with digital driving circuits. The controller circuitry interfaces with both the host computer for the floppy-disk drive and to the motor driving and sensors of the transport mechanisms. Communications with the host computer may occur over most standard interfacing hardware of either a serial or parallel nature, and, as will be seen, is mainly to notify the controller that another disk is needed and then to notify the host when the new disk is ready and in place. Most any known and available microprocessor or multi-processor system can be utilized to fulfill the needs of the controller with the addition of the driver circuitry.

More specifically, and referring to FIG. 1, there is shown generally in accordance with the invention an information storage and retrieval system 24, comprising generally a storage area or section 26, a transducer 28, a transport mechanism 30, an entry device 32, which may be a part of a host computer system, a controller 34, and interconnecting circuitry 36.

The storage section 26 in this embodiment is in the form of a bookshelf or rack 38 provided with opposing grooves or slots 40 in upper and lower surfaces, and disk assemblies 42 are held from sideward movement in the rack or shelf by the sides of the grooves 40.

Figure 3C:
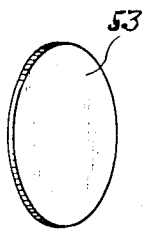
FIG. 3c is a perspective view of an information containing medium in the form of a disk that may be used in the system of this invention.
Figure 3A:
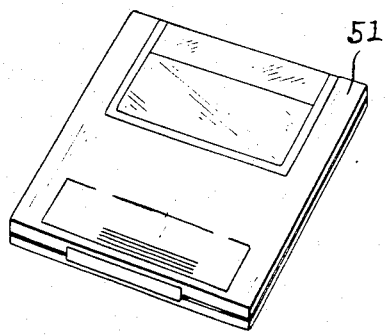
FIG. 3a is a perspective view of a cartridge for information containing media that may be used in the system of this invention.
Figure 3B:
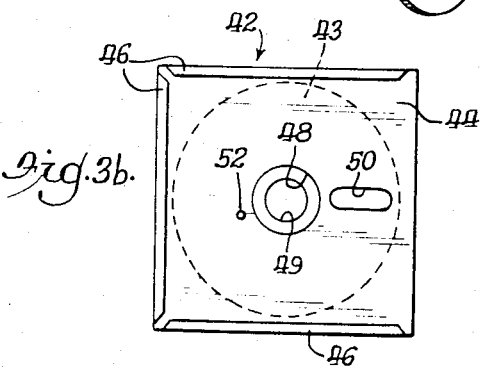
FIG. 3b is a plan view of an information containing medium in the form of a disk-jacket unit or diskette that may be used in the system of this invention.

The jacketed floppy-disk assembly 42 is best seen in FIG. 3b and comprises a thin flexible magnetic disk 43 rotatably disposed in a square envelope or jacket 44 of somewhat thicker material. The jacket is closed on three sides by flaps 46 superimposed on one side of the sheet and adhered to the same by a suitable adhesive. Both walls of the jacket 44 have coincident central openings 48 and coincident radially extending oblong openings or slots 50 in their two thicknesses. There is also provided a synchronization aperture 52 off to the side of the central opening. The disk 43 also has a central opening 49. This central opening 49 is of smaller diameter than the openings 48 so that the disk 43 is revealed within the openings 48.

The transport mechanism 30 comprises a carriage 54 that is translatably disposed on a parallel pair of rods 56. Preferably, these rods are made of stainless steel and may be a kind known as Thomson ball shafts. The carriage 54, in such event, contains a corresponding Thomson bushing (not shown) receiving each shaft and permitting sliding movement of the carriage thereon. The shafts are supported by end brackets 58. The carriage 54 is translated, i.e., moved from one location on the shafts 56 to another location, by a centrally mounted lead screw 60. Rotation of the lead screw 60 is by means of a suitable motor 62. As will be described hereinafter, preferably this lead screw motor 62 is a stepper motor and is controlled by the controller. The carriage 54 contains a captured follower (not shown) that causes the carriage to move upon rotation of the lead screw 60. One example of a construction of a lead screw that has been found satisfactory is a four pitch-four threads per inch screw. Further, if the storage area contains slots that are on ½ inch centers, then two revolutions are necessary to translate the carriage between each disk slot. Furthermore, if the motor 62 is a stepper motor having 200 steps per 360° rotation, then 400 steps are needed to translate the carriage 54 the distance of one disk slot. Accordingly, any location along the length of the storage section 26 is a multiplication of the slot number times the slot-to-slot number of steps.

The controller 34 is connected by means of the circuitry 36 to the lead screw motor 62. The controller does all calculations of distances for the translation in any direction of the carriage containing a disk. As in the foregoing example, the calculation would include the multiplication given plus the drive number times the drive-to-drive number of steps, with a correction factor for the slot and the drive numbering schemes. As it will be seen, the lead screw motor 62 is not the only driving means of the apparatus, and the controller needs to factor in the particular drive motor in calculating the movement required.

The purpose of the carriage 54, of course, is to move one of the jacketed floppy-disk assemblies 42 between its storage area and the transducer 28. In this connection, the transducer 28 contains at least one opening 64 for receiving a disk assembly 42. In keeping with the intent, for simplicity, to completely illustrate and describe the invention as it relates to only one particular storage medium, in this instance the floppy-disk, the transducer 28 is preferably a floppy-disk drive and is either the main drive or a drive in an expansion unit.

In this connection, however, it is an advantage of this invention to have the ability to store, access, and retrieve information from a combination of media, such as those illustrated in FIGS. 3a, 3b, and 3c, as well as from any one of the media individually. FIG. 3a illustrates a cartridge 51 and is representative of the possible cases containing disk or film storage media. For example, the removable cartridge produced under the mark IOMEGA can be accommodated in the system of this invention, either as a single medium or in combination with other media. In such instance, of course, the transducer 28 would include a drive for the removable cartridge and a drive for any other storage medium in the same system.

FIG. 3c is representative of any medium in the form of a circular disk 53, such as a video disk. This invention contemplates accommodating circular disks also in the combination of media. An appropriate drive unit for the circular disk would also be included in the transducer 28 along with the drives for the other media where a combination is utilized in the system. The controller 34, described hereinafter, is programmed to identify and remember the various of the media in the mix and the respective locations of the same.

As mentioned previously, the carriage 54, controlled by the lead screw 60, can be moved to positions opposite a given slot and then moved again to a precise location opposite the opening 64. The opposite movement, of course, occurs for the return of the disk to its storage area. The translation of the disk between these two precise points is accomplished by the functioning of the lead screw 60 driven by the lead screw motor 62. This translation is in the horizontal direction and is said to be along the X-axis or in the X direction. When the carriage is opposite a slot 40 holding a selected or desired disk, a movement of a disk holding arm 68 carried on the carriage 54 is then activated in a direction transverse to the lead screw to pick up the disk assembly 42 from its storage area. This is accomplished by a drive motor 66 for in and out movements of the holding arm 68. This drive motor is energized by the controller at the time the carriage arrives at the point opposite the correct slot 40. As far as the schematic of FIG. 1 is concerned, the detail of just how the motor 66 causes the pick up of the disk assembly 42 is not seen. This will be explained hereinafter in connection with the apparatus shown in FIGS. 2, 4 and 5. Suffice it for this point to say that the motor 66 causes the holding arm 68 to move transversely of the carriage drive into the selected disk, grip the selected disk and retrieve it by moving back onto the carriage. The carriage then translates the disk to the precise point opposite the opening 64 where another transverse movement by the motor 66 moves the disk assembly 42 into the disk drive 28 and leaves it there for reading. At the conclusion of the reading, the reverse action occurs whereby the disk assembly 42 is picked up, translated by the carriage 54 back to a position opposite its storage slot, and then replaced into the storage slot. All of this is under the control of the controller 34 in accordance with programs to be explained hereinafter. The controller 34 may receive its instructions from an operator at the entry device 32. Although this entry device would normally be the host computer, it could represent an entry device other than the host computer located in another building or even in another geographical area.

A system as the one just described in connection with FIG. 1, for identification purposes is called a single row pick and place system. The storage area may be three or four feet in length in the horizontal direction and could lie flat on a desk or table, for example.

A vertical stack of such bookshelves or racks 38 will multiply the storage capacity while utilizing wall space and minimizing floor space. Such a stack may comprise two or more shelves as needed, generally in a vertical plane. One such stack or assembly of shelves over one another in an operable apparatus is shown in FIG. 2. There a frame 70 provides support for six storage shelves with space below the bottom shelf for clearing the apparatus as it moves in the X direction. Although the definite number of six shelves is shown, it should be understood that the principles of the invention are being applied to multiple shelving, and there is no reason to limit the invention to the six shelves as shown and described. As applied throughout this description, the same reference numbers are used for like elements. Subscripts are applied where some differences in the elements exist. Thus, the transport mechanism 30 is mounted in the base of the frame 70 for translating the carriage 54a in the X direction. The frame 70 may be constructed of suitable material for the strength and weight of the apparatus supported, and appropriate covering material may be applied to the outside of the frame to enclose the structure while yet providing access to the inside thereof and to attractively fit into the decor of the surroundings in which it is to be located. In this instance, a transparent panel 71 is illustrated.

The stepper lead screw motor 62 is separately mounted and provides rotory power to the lead screw 60 by means of a timing belt 72. A timing belt, as opposed to a regular smooth surface belt, is provided because of the need for positioning accuracy of the device. Thus, when the motor 62 shaft makes one complete revolution, there is assurance that the lead screw likewise makes one complete revolution. There is no slippage between the two. As may be seen in FIG. 5, the ratio of the driving pulley to the driven pulley is 1:1. Consequently, the lead screw will make one revolution for each revolution of the stepper motor shaft. This, of course, is in accordance with standard engineering principles, and a different ratio may be selected depending upon the speed of the stepper motor and the desired speed of translation of the carriage 54a. Although there are no joining electrical wires indicated in FIG. 2, it should be understood that the electrical devices in the apparatus of FIG. 2 are suitably connected to the controller 34 as by an interconnecting circuit 36, all as shown in FIG. 1.

Each storage shelf comprises opposing slots or grooves 40, each of which may carry a jacketed floppy-disk assembly 42. In this connection, however, the slots 40 may be formed to accept other media, such as the cartridge shown in FIG. 3a or the disk-shaped medium shown in FIG. 3c. It is noted that the disks are carried vertically. Thus, the tendency for gravity to apply continuous force to the surface of the disk and therefore warp or otherwise distort the surface is minimized. The slots 40 are to be evenly spaced, i.e., on equal centers relative to one another. The slots may be milled or otherwise formed in the material of the shelving, and an example of suitable material for such shelving is polyvinylchloride. Such material has good strength and yet can be machined.

The carriage that traverses in the X direction is referred to in FIG. 2 as 54a, because a functional difference occurs between the carriage 54a here shown and the carriage 54 in FIG. 1. In this instance, the carriage 54a has as its principal function the translation along the X-axis. A motor 74 mounted on the carriage 54a, however, provides motive power for translation of a carriage 77 in the vertical direction, which is also said to be along the Y-axis or in the Y direction. Thus, a further transport mechanism 76 is provided for the Y-axis, the first mentioned transport mechanism 30, therefore, being for the X-axis. This transport mechanism 76 comprises the carriage 77 that is translatably disposed on a parallel pair of rods 78 in like manner to the carriage 54 on the rods 56. Preferably, these rods are also made of stainless steel, and they may be the kind known as Thomson ball shafts. The carriage 77 contains corresponding Thomson bushings (not shown) receiving each shaft and permitting sliding movement of the carriage thereon. The shafts are supported at their lower end by a mounting block 80 carried on the carriage 54a, and on the upper end by a mounting block 82 supported on and carried by a guideblock 84. A rod 86 is mounted in the upper portion of the frame 70 parallel to the lower mounted transport mechanism 30 and provides direction and support for the guideblock 82. Again, the rod 86 is preferably of stainless steel, and it may be of the kind known as Thomson ball shaft. The guideblock carries a Thomson bushing receiving the shaft 86 and permitting sliding movement of the guideblock 84 thereon.

The carriage 77 is translated, i.e., moved from one location on the shaft 78 to another location, by a centrally mounted lead screw 88. Rotation of the lead screw 88 is by means of the motor 74 on the carriage 54a. This lead screw motor 74 preferably is a stepper motor and is controlled by the controller 34 (FIG. 1). The carriage 77 contains a captured follower (not shown) that responds to the threads of the lead screw 88 and causes the carriage to move either up or down upon rotation of the lead screw. The distance between centers of the shelves, of course, can be accurately determined, and this distance will vary in accordance with the particular storage media being stored. We have indicated that in the instance of the floppy-disk, the typical is to use either an 8 inch or a 5¼ inch diameter disk. The shelves should be equally and carefully spaced for the precise translation of the carriage 77 in this apparatus. The stepper motor has a given number of steps per 360° rotation, and these steps times the distance between centers of the shelves determine the total movement needed by the carriage 77 for its vertical translation. Accordingly, any location along the height of the storage area or assembly of bookshelves within the frame 70 is a multiplication of the shelf number times the shelf-to-shelf number of steps plus a fixed number from the base to the center of the first shelf.

Again, the controller 34 is connected by means of circuitry similar to the circuitry 36 to the lead screw motor 74. The controller does all calculations of distances for the translation of the carriage in the Y direction. The purpose of the carriage 77, of course, is to move one of the jacketed floppy-disk assemblies 42 from its storage area to the level on which the transducer 28 is contained. In this respect, a further description is provided in connection with FIG. 6.

Thus, there has been provided description for translating the carriage 77 both in the X and Y directions. When the carriage 77 is located opposite the combination of the selected shelf 38 and the particular slot 40 containing the desired floppy-disk assembly 42, a movement of the disk holding arm 68 carried on a carriage 79 supported by the carriage 77 is then activated for in and out movement transversely of the lead screw 88 to pick up the disk assembly 42 from its storage area. This is accomplished by the drive motor 66 which moves the carriage 79 in and out by means of a rack 90 and gear 92 arrangement as seen in FIGS. 4 and 5.

Referring now to FIG. 5, a grab and hold device 94 is provided along the vertical portion of the holding arm 68, and it preferably is located either near the top or near the bottom of the holding arm. Top views of the grab and hold device 94 are shown in FIG. 7, where the device is closed, and in FIG. 8, where the device is open. The purpose of the grab and hold device is to provide means for gripping the storage medium, in this instance the jacketed floppy-disk assembly 42. The grab and hold device 94 comprises a solenoid coil 96, a solenoid plunger 98, a cross section 100 of the vertical member of the holding arm 68, a pair of opposing gripper arms 102 and 104 and a pair of identical but opposing spring loaded arm retainers 106. The gripper arms 102, 104 further include an extended pair of faces, which when together, are parallel and are under spring tension to provide a gripping force for anything therebetween. The arms also include legs that are formed around the arm 100 through which the pair of spring loaded arm retainers are extended. These spring loaded arm retainers bias the two gripper arms 102, 104 to a closed position around the arm 100. In the closed position, the gripper faces are parallel. This is the condition when the solenoid coil 96 is in its normal or deenergized condition. In such instance, the solenoid plunger 98 is returned within the solenoid coil under urging of a spring (not shown) within the solenoid. This is the condition shown, for example, in FIG. 7. At the appropriate time, the controller 34 provides a signal to the solenoid coil 96 which energizes the solenoid and thrusts the plunger outwardly. As seen in FIG. 8, when this occurs, a blunt nose on the outside end of the plunger cams the gripper arms 102, 104 apart at their extended end and against the urging of the spring loaded arm retainers 106. Thus, the grippers are opened to either receive or to release the storage medium or floppy-disk assembly 42. The electrical operation can be the same as the holding arm 68 moves into the storage area toward the slot. If the grab and hold device 94 is empty going in then it grabs the disk assembly 42 and retracts it on its reverse movement. If on the other hand, the grab and hold assembly 94 is already carrying the disk assembly 42 on its inward movement, then the opening of the gripper arms releases the disk assembly 42 and leaves it in its storage position in the particular slot 40 as the carriage 77 is retracted.

The grab and hold device could be part of a pair of such devices so that a first and empty grab and hold device can remove a medium from the drive while a second inserts a waiting medium into the drive, thus eliminating the need to first unload the old medium before finding and inserting a new medium.

It should be noted in FIG. 5 that a space 108 is provided between adjacent shelves 38. This permits the carriage 77 to move inwardly all the way to the cabinet surface between the shelves as it carries the disk assembly 42 into the slot for storage. This construction has the advantage of decreasing the amount of depth required for the apparatus. It can also be seen in FIG. 5 that the holding arm 68 has two projecting legs 110, each with grooves therein, that carry the disk assembly 42. The depth of the shelving 38 is less than the length of the jacket 44 of the disk assembly 42 by a dimension substantially equal to the length of the extended arms 110. Thus, when the carriage 77 moves in to either deposit or retrieve a disk assembly 42, the completed movement inwardly will allow the holding arm 68 to either completely position the disk assembly 42 in its storage slot or to completely support the disk assembly 42 in a retrieval move, because of the relative length and positions of the interfacing parts.

As also noted in FIG. 5, the motor 66 is offset from the gear 92 and provides rotational motion to the gear 92 through a timing belt 112. The in and out movement of the carriage 79 by the motor 66 may be controlled by a plurality of sensors (not shown) that sense the position of the carriage and activate electrical switches to stop, start, or slow the movement of the carriage as appropriate. This may be accomplished in accordance with standard electrical principles in motor control circuitry. On the other hand, the motor 66 can be a stepper motor with a given number of known steps per revolution of its shaft, and the travel distance for the carriage being able to be predetermined, allows the entire control to be under the operation of the controller 34. Preferably, the stepper motor approach is used.

A question that is addressed typically in automated devices is what provision is there other than in the program for error in, for example, the positioning of the transport mechanisms. In this instance, suppose, for example, the holding arm 68 carried on the carriage 79 for in and out translation is not quite aligned so that the grooves in the arms 110 will pick up the disk assembly 42. Thus, when the carriage 79 begins its inward movement, the outer ends of the arms 110 will strike the edge of the floppy, and potentially damaging at least the jacket. Construction has been provided to avoid damage with this kind of error, and it lies in repositioning the driving connection from the carriage 79 to the holding arm 68 so that the connection instead of being along the bottom extended arm 110, as indicated, would occur rather along the vertical leg of the holding arm. Both extended arms 110 then comprise a rod extending through a bushing at each end of the upright portion of the holding arm 68 so that the rod is slideable therein. The outer end of each rod carries a small holding element having a groove therein that will engage the disk assembly 42 and the other end of the rod on the opposite side of the upright of the holding arm would be attached to the holding arm by means of a spring. Thus, if the front end of the extended arm 110 is not correctly aligned and strikes the outer edge of the disk assembly 42, the arm merely slides through the bushing and extends the spring, which if extended far enough strikes a sensor which interrupts the circuit. Such sensors and switches may be of the kind known in the marketplace as microswitch devices and may be mounted to act as limit switches as needed.

As mentioned previously, the translation of the carriage 79 is in a direction front-to-rear or in and out in the horizontal direction and may be said to be translated along the Z axis or in the Z direction.

The apparatus described thus far has taken advantage of space that is generally available along a wall, taking up relatively little floor area. It has been suggested earlier that another form of the vertical apparatus could be in the form of a plurality of short rows or shelves of disk assemblies stacked on top of each other and placed between two working areas, such as two desks. This could also be between a desk and a wall in a corner.

Figure 11:
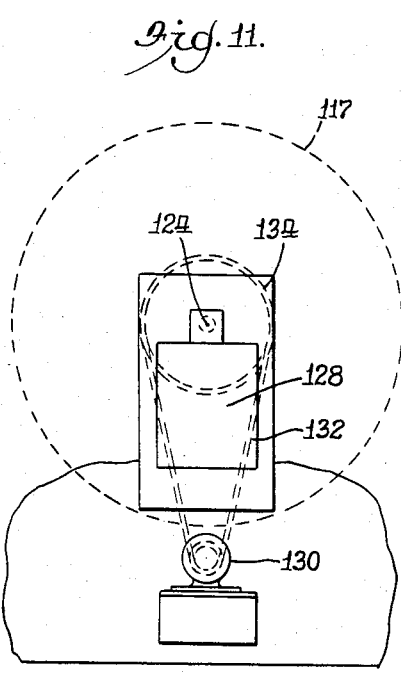
FIG. 11 is an end view of a rotary drive for use in the apparatus of FIG. 10.
Figure 12:
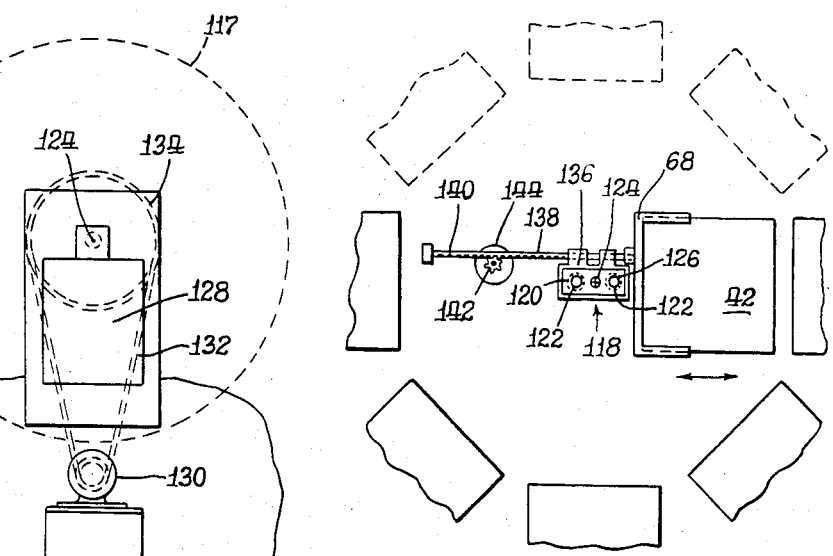
FIG. 12 is a schematic illustrating the end view of the polygonal storage apparatus of FIG. 10 and also illustrating how the construction can utilize only a part of the complete polygon.

Occasionally, there are situations where floor area may be more readily available than height along a wall. A very efficient arrangement has been found in the form of apparatus shown in FIG. 10. Here there is shown a frame 114 supporting a plurality of rows of disk assemblies 42 arranged around an axis so as to form a polygon 115 in cross section. In actuality, the rows are disposed so as to be substantially tangent to a cylinder of reference of a given diameter defining an access corridor 116. The reference cylinder is identified in dashed lines as reference No. 117 in FIG. 11. The reference cylinder should be just large enough to accommodate the transport apparatus described hereinafter. The polygon in this illustrated example is eight-sided, or an octagon. The transport mechanism is mounted so as to operate axially in the approximate center of the corridor. In the three-axis terminology, this would be the X-axis. The transverse in and out or Z movement can best be seen in FIG. 12. Here, a floppy-disk holding arm 68 is seen just to the right of the axis, and its movement to the storage position on the right would be in a back and forth direction as indicated by the arrow. This far, the transport mechanism could be as that shown in FIG. 1 in connection with the transport mechanism 30. A further requirement, however, is the need for rotational motion to set up the floppy-disk holding arm 68 in the correct angular position in front of the desired storage area before the Z translation can be effected. Thus, the transport mechanism in this instance differs somewhat from the transport mechanism 30 shown in FIG. 1. In FIG. 12, a transport mechanism 118 includes a carriage 120 slideably disposed on a pair of parallel rods 122 that in turn are on either side of a lead screw 124. As before, the rods are preferably of stainless steel and may be of the kind known as the Thomson ball shafts carried in Thomson ball bushings 126 mounted within the carriage 120. It will be noted that the lead screw is coaxial with the access corrider and the surrounding polygonal arrangement. The translation of the carriage 120 and the rotation of the whole transport mechanism 118 is accomplished by means shown in FIG. 11.

Here the central lead screw 124 is shown in dashed lines, and rotational motion for this lead screw is provided by a lead screw motor 128. As previously, preferably this lead screw motor is a stepper motor under the control of the controller 34 (FIG. 1). This lead screw 124 thus effects the X-axis translation of the carriage 54 through the access corrider of the polygonal arrangement shown in FIG. 10. The lead screw 124, of course, remains relatively fixed during rotation of the entire transport mechanism, because the lead screw 124 is coaxial with the transport mechanism. Rotation of the transport mechanism is effected by a motor 130, a chain or timing belt 132, and a sprocket 134. The sprocket is connected to an end mounting of the transport mechanism 118 so as to effect rotation thereof in conjunction with the rotation of the sprocket. The motor 130 preferably is a stepper motor being indexed for eight divisions (assuming the octagon arrangement shown in FIG. 10) and is also under the control of the controller 34. The location of a particular row of stored disk assemblies 42 is given in angular position corresponding with one of the eight divisions of the stepper motor. Thus, when that particular row is called for, the stepper motor under the controller 34 indexes to that angular position. Once the appropriate angular position is achieved and the carriage 120 has been translated in the appropriate distance along the X-axis, then the in and out movement or Z-axis translation is ready for activation.

Referring once again to FIG. 12, it will be noted that the carriage 120 carries on its upper surface a bearing block 136 having two sets of twin bushing chambers through which extend a pair of parallel rods 138. Only the rod 138 closest to the viewer is seen, but a like rod is behind the rod visible to the viewer in a manner similar to the pair of rods 126 on which the carriage 120 is slideably disposed. The rods 138 are connected in a suitable manner to the floppy-disk holding arm 68, and so any back and forth sliding movement of the rods 138 carry with them the holding arm 68 and any storage media, such as the illustrated floppy-disk assembly 42, carried therein. To effect the back and forth movement (Z-axis translation) of the holding arm assembly, a rack 140 and gear 142 combination are driven by a motor 144. The rack is represented by the dotted lines and is physically located betweeen the two rods 138 in much the same position as occupied by the lead screw 124 in between the rods 126 on which the carriage 120 is slideably disposed. The polygonal arrangement is, of course, precisely determined and constructed, and all angular distances from the axis to the storage shelves are equal to each other. Thus, with these fixed distances, and with use of stepper motors having known steps per revolution, the controller 34 can calculate the needed distances for translation in the Z direction.

The disk assemblies that are stored in the overhead slots can be retained in the overhead positions by simply applying a small amount of elastic material in the slots to apply a pressure against the jackets of the disk assemblies. In this connection, it should be noted in FIG. 12 that the overhead positions are shown in dashed lines. In the event a complete polygonal arrangement is not needed or room is not available for such, a "tub" arrangement may be effected by using only the lower rows as shown. Note that in the arrangement shown in FIG. 10, all disk assemblies are mounted to lie in vertical planes. The "tub", of course, also could be the inverted version of that shown in FIG. 12.

In the various arrangements thus far described, the interfacing of the storage apparatus with the transducer has been shown only in connection with FIG. 1. Accordingly, a selected disk assembly 42 is translated in the X direction to the transducer 28 and deposited in the slot 64 in the transducer. The reverse action replaces the disk assembly 42 to its storage location. With reference to FIG. 6, it will be noted that the system described in connection with FIG. 2 has options available as to interfacing with the transducer. An advantageous result of the construction of the bookshelf arrangement in accordance with the invention is that it can be provided as a complete system to a user. Thus, the system could include a built-in transducer and require only electrical connections for interfacing with a computer terminal. Such an arrangement is shown in FIG. 6 with the transducer 28 being shown in solid lines and internally of the framework 70. In such an event, the framework 70 is solidly closed along the right side. Another advantageous result of the system, however, also includes the ability to interface with a user's existing transducer, and this is shown with the user's transducer in dotted lines and the frame 70 open to permit translation of the disk assembly 42 to a point just external of the frame 70. This permits a person having an existing installation of a computer system to enjoy the fruits of the invention for increased storage capacity at relatively little cost, particularly when compared with alternative systems. One example of a physical construction as illustrated in FIG. 6 is a frame constructed of 2 inch angle iron and having overall dimensions of 6 feet high, 4 feet wide, and 2 feet deep.

Figure 10:
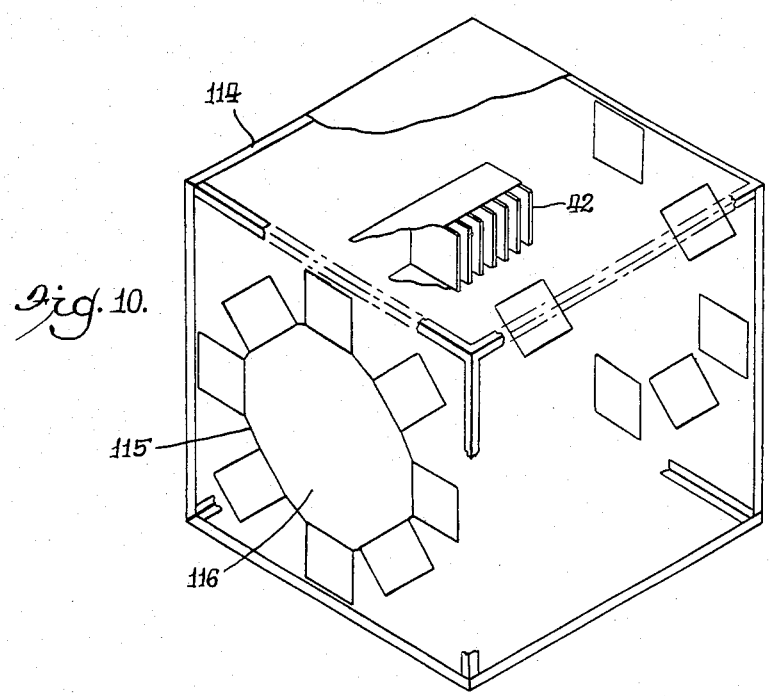
FIG. 10 is a perspective view of alternative apparatus in the form of a polygonal storage arrangement having a central access corridor in accordance with the invention.

As to interfacing with a transducer for a system structure as illustrated in FIG. 10, a transducer 28 may be disposed along side, but facing the side, of the framework 114 with access through a panel for the Z movement of the holder arm 68 in the apparatus shown in FIG. 12. Thus, instruction from a routine would apply to one particular location only (in line with the opening in the transducer) to extend additionally so as to place the disk assembly 42 in the disk drive.

Several times throughout this description, reference has been made to at least one opening 64 in the transducer or disk drive. In fact, generally more than one such opening is provided and these openings have covers or doors (often referred to as dust covers). The operation of this system assumes the door is open at the point of readiness for insertion of the holding arm 68 therethrough to either place a disk in the drive or grab a disk to remove from the drive. This door opening is accomplished by commands in the program routines at the appropriate time as will be seen hereinafter in connection with the flow charts in FIGS. 15-21. A solenoid is placed to operate in connection with the mechanism of the transducer or disk drive and is activated upon command. The solenoid is disposed such that when activated, it accomplishes the same result as an operator would accomplish by a hand movement in snapping the doors to the open position. Most of these doors snap open under spring action when a button is manually depressed.

An alternative transport drive, particularly for the X direction, is illustrated in FIG. 9. This schematic illustrates a cable system driven by a stepper motor 146 driving a timing belt 148 which in turn drives a cable drum 150. A suitable flexible, steel cable 152 is entrained around a series of pulleys to form a closed loop. The pulleys are slightly offset to prevent the cable from contacting at the crossover point. This can be accomplished, for example, by providing the two pairs of front pulleys on a common axis for each pair, but making one pulley of each pair larger in diameter than the other, the pulleys of equal diameter carrying the steel cable being in immediate sequence. This arrangement could result in a lower cost system. This cable system is of particular advantage for apparatus employing the 5¼ inch floppy-disk, especially if storage is on one or two levels only.

A general block diagram of the controller is shown in FIG. 13. Here is shown a communications interface with, for example, an RS232C. This interface may be a serial interface or a parallel interface. The interface is into the input port and USART which in turn have communication with the CPU microprocessor below which is the RAM and ROM. From the CPU also is the motor and solenoid controls and communication to the input ports into which are feed the sensors. The motor and solenoid control is shown schematically as extending one to each such motor.

FIG. 14 shows schematically a motor drive with a 24 volt bias applied to the collector of each of the NPN transistors thereshown. The phases represent various commands to the motor as needed. These drive circuits are standard parallel input/output ports with high drive current buffers, for example 74244's, driving a medium power TO-220 driver circuit which drives the output switching transistors, which may be 2N3773's, and drives the motors via the standard circuits (diode protected). The controller circuitry interfaces to both the host computer for the floppy-disk drive and to the motor driving and sensors of the system. Communications with the host computer may occur over most standard interfacing hardware of either a serial or parallel nature, and at present is mainly to notify the controller that another disk is needed and then to notify the host when the new disk is ready and in place. Most any microprocessor or multi-processor system can supply the needs of the controller with the addition of the driver circuitry. One example of devices that can be used in the system is the Monolythic Systems Corporation molded MSC-8001 computer board which incorporates a Z-80A microprocessor, a serial port, and six sets of eight bit parallel ports on a multibus compatible board. The parallel ports are used for motor and sensor control and for reading. Power supplies needed are ±12 volts d.c. at 100 milliamps for the RS-232C serial communications, +5 volts for the CPU board, and +24 volts for the motor driver circuitry.

Normally, the communications interface would use phrases such as the host computer stating: "Remove disk from drive No. 2 and replace disk in storage slot No. 17 of row No. 1." This assumes a multiple number of rows of slots. The host computer might then state: "Obtain disk from storage slot No. 46 of row No. 1 and place in disk drive No. 1." Alternatively, the host computer may request only a code name to identify the disk or the file on the disk, the statement then being, for example, "Obtain the Jones file." In such event, it is the controller that remembers the location of the appropriate disk or file.

Depending upon other requested communications, the controller may signal completion of each of these events, or may remain mute and just execute the host's commands.

The controller does all calculations of distances for the arm to travel in any direction. As a basic example, one of the stepping motors provided has 200 steps per rotation, and one of the lead screws is of four pitch-four threads per inch. If the storage area has ½ inch spacings, then two revolutions are necessary between each disk slot, or 400 steps. Thus, any location is a multiplication of the slot number times the slot-to-slot number of steps, plus the drive number times the drive-to-drive number of steps, with a possible correction factor for the slot and drive numbering schemes. The extent of time for each motor pulse is calculated according to the speed of translation of the arm, and this may be counted by either a clock/timer circuit or a software count-down loop. It was mentioned previously that the stepping motor is relatively easy to control with digital driving circuits. Either an output port which uses clocked (hardware) or timing loop (software) to drive a rotating sequence of "on" pulses, or a straight hardware style of output may be used. The sequence is normally 1001, 1100, 0110, 0011 for "clockwise" shaft rotation; or 1001, 0011, 0110, 1100 for counterclockwise rotation.

Referring now to FIGS. 15 through 19, there are shown flow charts of the executive program and the subroutines for operating the system of the invention. FIG. 15 is the executive program which begins its cycling upon power up of the system. After initialization, the question is whether a character has been received yet. The character may come, for example, from a keyboard of the host computer, or it may be received from a generated signal from another source. If no character is present, the cycle is repeated. If a character is present, an examination is given whether the character is an end of message character. If no, instruction is to store the character in a buffer and then to recycle. If the character is an end of message character, then the message received is analyzed and the answer to the question is determined whether a media is to be retrieved from storage. If yes, the question is whether a medium is currently in the drive, for example, the floppy-disk drive. If there is no medium already in the drive, then a call is made for the media retrieve routine (M1), after which the routine is returned to the point of awaiting a character. If, on the other hand, there is a medium currently in the drive, then a call is made for the media replace routine (M2) after the completion of which a call is made for the media retrieve routine (M1). Again, after the media retrieve routine, the cycle is back to the point of awaiting a character.

If the medium is not to be retrieved from storage, then the question is asked whether a medium is to be placed back into storage. If the answer to this question is yes, then a call is made for the media replace routine (M2), after the completion of which the routine is returned to the point of awaiting another character. If the media is not to be placed back into storage, then the question is asked whether this is a list of media names, locations and types. If yes, instruction is given to store the data in a table. After that, the program is returned to the point of awaiting a character. If no, the question is asked whether it is another recognizable command. If yes, instruction is to perform the function, after which the routine is returned to the point of awaiting another character. If no, the instruction is to send an error message to the host, after which the program returns to the point of awaiting a character.

The media retrieve routine (M1) called for in the executive program is shown in FIG. 16. The enter command here would be a result of the cycling of the executive program to the point where a call is made for the M1 routine, or the "enter" command could come from one of the subroutines. After the start-up of the routine, the instruction is to call the motor movement routine (M3) with media location as destination. For example, a location of shelf 4, slot No. 23 would be signaled as the destination for the motor movement. After the completion of the M3 routine, a call is made for the media grab and insert routine (M4). After the completion of the M4 routine, there is a return to the M3 routine, i.e., the motor movement routine with the correct drive as destination. Upon reaching the appropriate disk drive, a signal is provided to activate the solenoid to open the drive door to permit entry of the disk into the drive. Thereafter, there is further instruction to call the media grab and insert routine (M4). After the completion of this M4 routine, the instruction is to return to the point in the executive program at which it was called. Thereafter, the executive program controls once again.

Figure 17:
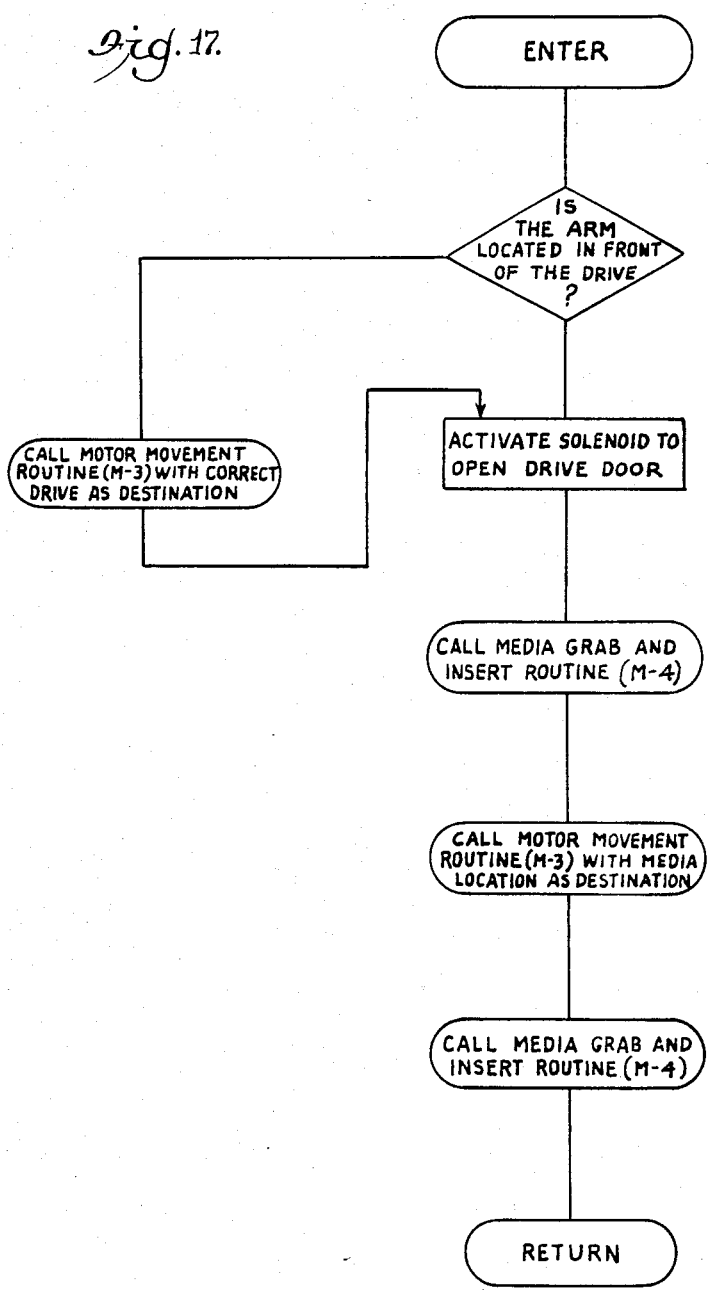
FIG. 17 is a flow chart of a media replace routine for use in the program of FIG. 15.

The media replace routine (M2) called for in the executive program is shown in FIG. 17. Once again, the routine would be entered by either the executive program or from one of the subroutines. Upon entering this routine, the question is first asked whether the arm is located in front of the drive. This refers to the disk drive in the transducer. If no, the instruction is to call the motor movement routine (M3) with correct drive as destination. After this, the command is given to activate the solenoid to open the drive door. If, on the other hand, the arm is located in front of the drive, then the instruction is given immediately to activate the solenoid to open the drive door. Thereafter, the instruction is given to call the media grab and insert routine (M4). After the completion of this subroutine, the instruction is given to call the motor movement routine (M3) with the media location as destination. Upon completion of this M3 routine, the instruction is given to call the media grab and insert routine (M4). After the completion of this M4 routine, the routine returns to the point in the program at which it entered. In this instance, the M2 routine was called upon as a part of the executive routine.

Figure 18:
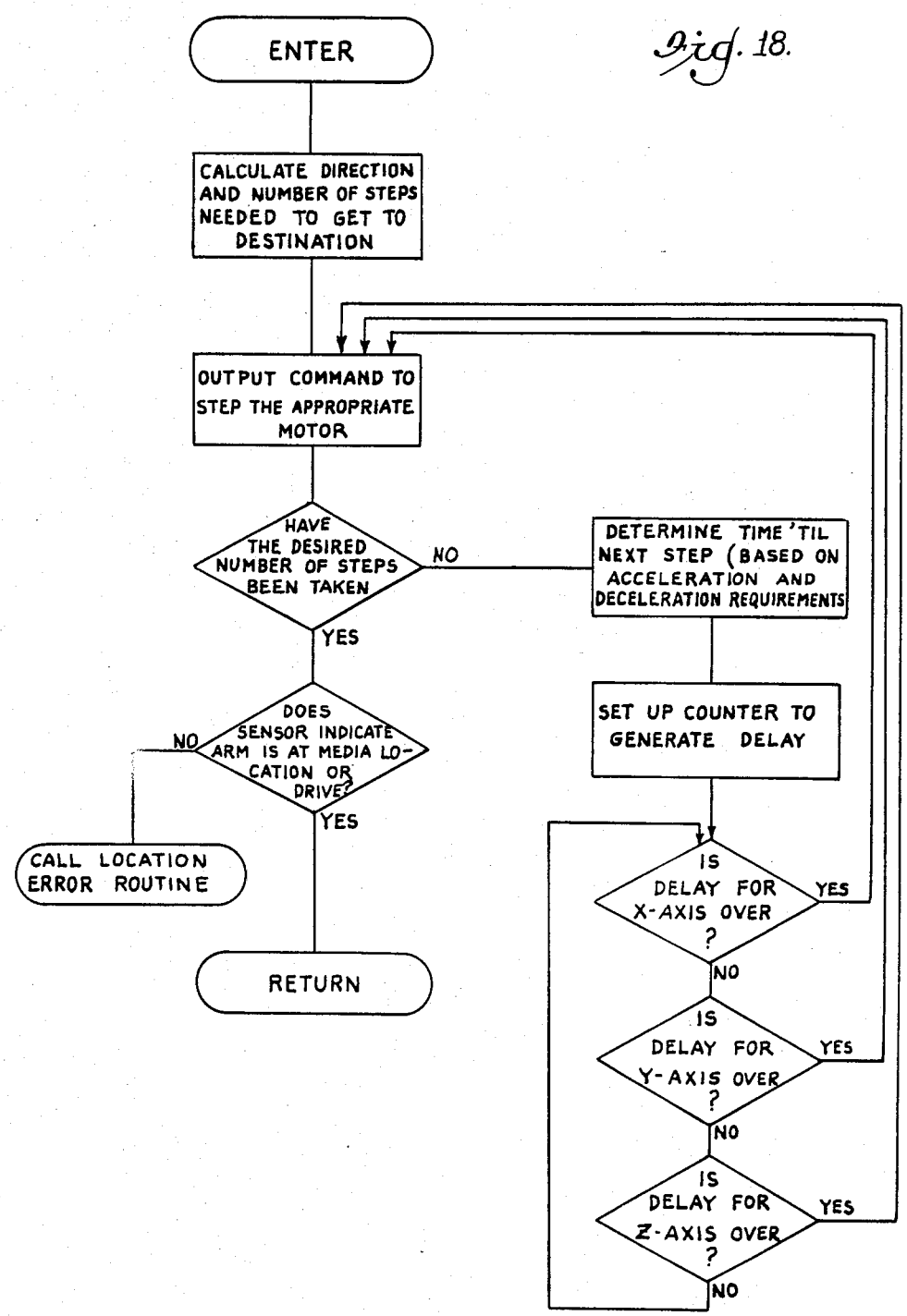
FIG. 18 is a flow chart of a motor movement routing for use in the program of FIG. 15.

Reference has been made in the subroutines to a motor movement routine (M3). This M3 routine is shown in FIG. 18. The entry command here would be likewise called for from either the executive program or one of the subroutines.

In this instance, it might be a result of either the M1 or M2 routine that caused the entry command. After entry, the instruction is given to calculate the direction and the number of steps needed to get to destination. As mentioned earlier, the motor drives are preferably stepper motors which have a given number of steps per revolution. Further, the distances to shelves and to slots are very accurately determined, and so the calculation is one based on known quantities predetermined according to the system. Upon completion of the calculation, the output command is given to step the appropriate motor. For example, the output command may be given to step the X motor. Then the question is asked whether the desired number of steps have been taken. If yes, the question is whether the sensor indicates the arm is at either one of media location or drive. If yes, the routine is returned to the point in the program where it entered. If the answer is no, then there is a call for location error routine to determine what has happened. One function of the error routine is to make sure the grab assembly is positioned correctly. At any point when a sensor indicates the arm is at an incorrect location, the arm will be sent back to a predetermined (in the program) start or check position for a recomputation of the correct number of steps to arrive at the originally instructed location. On the other hand, if the desired number of steps have not been taken then the command is given to determine the time until the next step (based on the acceleration and deceleration requirements. After this time has been determined, the instruction is given to set up a counter to generate a delay. After the delay has been generated, then the question is asked whether the delay for the X-axis is over. If yes, there is a return to provide an output command to step the appropriate motor. If the delay for the X-axis is not over, then a question is asked whether the delay for the Y-axis over. If yes, the routine is returned to the output command to step the appropriate motor. If, on the other hand, the delay for the Y-axis is not over, then the question is asked whether the delay for the Z-axis is over? Once again, if yes, there is a return to the output command to step the appropriate motor. If the delay for the Z-axis is not over, the routine is returned to cycle through the series of the axes again. Once each motor has been commanded to step, the number of steps have been taken and the sensor finally indicates the arm is at either the media location or the drive, the routine is returned to the point in the program where it was originally called for.

The media grab and insert routine (M4) which was also referred to in the previous subroutines, is shown in FIG. 19. Once again, this routine is called for from either the executive program or one of the subroutines. Upon entering, the command is given to step the arm motor toward drive or storage. The question then while the stepping is going on is whether the sensor indicating error is active. If yes, the command is given to send an error message to the host computer and then return to the executive program. If no, the question is asked whether the required number of steps have been taken. If no, the command is to wait an appropriate delay and then return to the point of commanding the step arm motor toward the drive or storage. Thereafter, the cycle would repeat. If, on the other hand, the answer is yes, then the question is asked whether to grab or insert. If to grab, then the command is given to close the grabber. If to insert, the command is to release the grabber. After either of these commands, the instruction is given for the step arm motor to move away from the drive or storage. Then the question is asked whether the required number of steps have been taken. If no, the command is given to wait an appropriate delay, after which the routine is recycled to the command to step the arm motor away from the drive or storage. If the required number of steps have been taken, then the routine is returned to the particular portion of the program at which it was caused to enter.

An alternative program executive is shown in the flow chart in FIG. 20. Here, as indicated, the program is normally started by the power-on or by a reset button. At that point, there is the initializing hardware that needs to be set up, namely set up the drivers, the tables, and the variables. The question is asked whether there is any communication to or from the host computer. If yes, the command is given to call the communication routines and interpret. If no, the question is asked whether there is any change in the sensor status. Here, if the answer is yes, then there is a command to call the sensor routines and interpret. If no, the further question is asked whether any motors need a new pulse sent. If yes, the command is to call the motor driver routines and timing routines. If no, the question is asked whether any action is being performed. If the answer to this question is no, then a command is given to call the free time routines. If a long time is available, may do back ups and so forth. If the answer is that action is being performed, then the program returns to recycle through this series of questions.

Figure 21B:
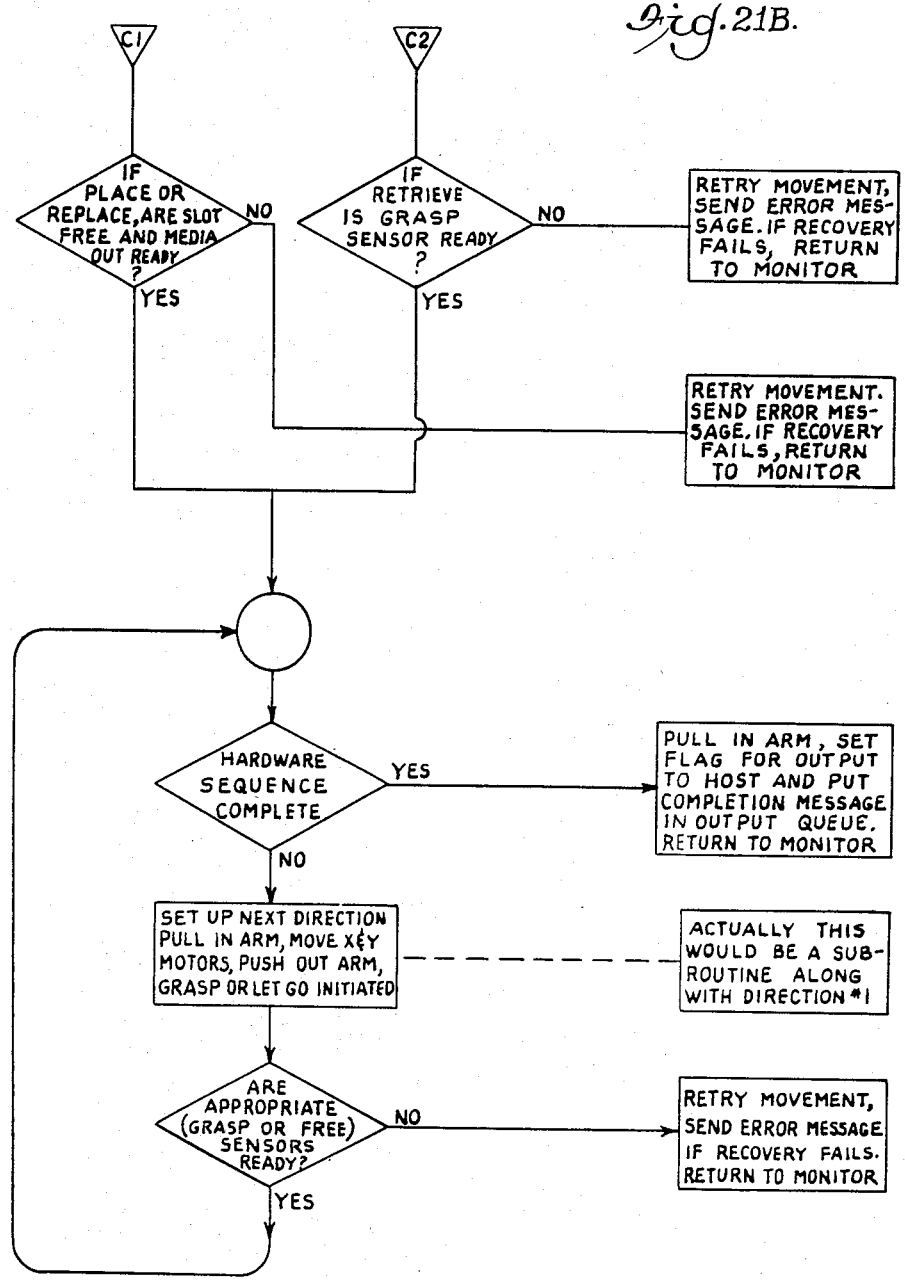
FIG. 21B is a continuation of the flow chart of FIG. 21A.

The communication routines flow chart is shown in FIGS. 21A and 21B. This communication routines would be called for from the monitor or to interpret as indicated in the previous program executive. The first question asked is whether the flag is set for the output to host. If yes, the question is asked whether the communication line is clear to send. Here, if the answer is yes, the command is given to send acknowledge message and clear the send message flag and return to the monitor. If the answer is no, then it returns to the point where it would be if the answer were no to the question whether the flag was set. In either of these instances, a no would lead the routine into the question whether communication is coming in. If no, the command is given to return to monitor. If, on the other hand, the answer to this question is yes, then a further question is posed, and that is whether the communication is recognized. If this answer is yes, then the instruction is given by software only to interpret, follow and return to monitor sequence. If the answer is no or media is incompatible, then the instruction is given to communicate an error message to the host. The normal hardware statement, if the communication is recognized, then follows to set up direction for X and Y motors and the number of steps to move. When this is done, an arm out movement is commenced (this means the movement of the carriage in the Z direction), and a grasp or let go is initiated. This, of course, depends upon whether the action is for retrieving the media from storage or whether it is placing it into the disk drive or replacing it to storage. The question is therefore asked whether it is retrieve or place or replace. If retrieve, then the question is, whether the grasp sensor is ready. If no, the command is given to retry movement and send error message. If the recovery fails, then return to monitor. If the answer is yes, then the routine asks whether the hardware sequence is complete.

If the routine is place or replace, then the question is asked, is the slot free and the media out. If no, the command is given to retry movement and send error message. If the recovery fails, then return to monitor. If the answer is yes, then the routine moves into the same position as with a yes answer on the retrieve conditions, and that is to ask whether the hardware sequence is complete. If this answer is yes, then the instruction is given to pull in the arm, set the flag for output to the host and put completion message in output queue. Then return to monitor. If the hardware sequence is not complete, then the instruction is given to set up the next direction, pull in the arm, move the X and Y motors, push out the arm, and initiate the grasp or let go. This generally is a subroutine along with the first direction. The last question is whether the appropriate (grasp or free) sensors are ready. If no, the instruction is given to retry movement and send error message if recovery fails. Thereafter return to monitor. On the other hand, if the answer is yes, then the routine returns to recycle through to the point beginning with the question whether the hardware sequence is complete.

After having described the basic operation and construction of the system, it will be appreciated that an important advantage of the system is in providing a mix-and-match ability not now known to be in the art. Such ability provides a large commerical marketing potential. The examples given herein have assumed a system handling completely either an 8 inch or a 5¼ inch floppy-disk. These examples, of course, were given for purposes of description and not for limitation. In fact, this system has the ability to handle, for example, 5¼ inch disks or other sized disks in their respectively sized slots on one or more levels and 8 inch disks or other sized disks on other levels. Appropriate predetermined commands and calculations are made a part of the program routines, and the appropriate shelving is provided. Once the dimensions are set, even though some shelves are shorter than others, the system can be made to function as well as in instances where the media are all the same. Again, the examples used even in this paragraph are for illustration and not restriction. Any media can be handled in this system by providing one whole shelf, for example, for a given medium. The instructions can then be determined in the program and the system set up for operation.

Summarizing, there has been provided a description and illustration of an information storer and retriever that is particularly useful for storing and retrieving stored media in a form of plastic disks. Although the system has a particular advantage in multiplying the storage capacity in a relatively inexpensive and space saving manner, the principles of the invention may well be utilized for other storage media. The system allows itself to be automatic. Thus, for example, the system can be used in off hours to provide removable media back-up copies. This can be done at the end of a series of operations or, as indicated, during part of a slow period in which the system might not otherwise be fully utilized.

The system as disclosed herein can contain the entire off-line storage of computer memory within a system which is accessible by one or more mechanical or robot-like arms (controlled by one or more computer boards and motor drivers) and placed into its own drive or that of the host computer which is accessed by an interface.

This new management of technology reduces the human bottle-necks within the total operations of computers. Some advantages of such a system are: (1) speed of access to offline memory, since the memory is being accessed automatically and not by an operator. Rather than searching and inserting into operation a recording medium such as a floppy disk, hard disk cartridge, memory card or other such container of media manually by an operator, the apparatus searches for the medium within its system and then places it into on line service. It not only completes these tasks faster than an operator could do it, but it can also provide; (2) both sequential and random access of off-line media and transfer it to on-line status while taking on-line media off line and delivering it to another point in the system without the continued presence of an operator; (3) safety of the media itself, especially the more volatile but low cost media such as floppy disks since such media is handled under much more controlled circumstances; (4) significant cost savings for providing memory to computer systems. This is of particular advantage to those who process large quantities of information on off-line storage and often purchase either larger computers or time-sharing services when an apparatus such as this can provide the growing memory needs at a much lower cost.

The system as disclosed herein also can be the means by which other computer peripherals are linked together through the system's own hardware capacity, such as other printers, photocopiers, and modums. It is recognized that other kinds of material that are being developed, or are yet to be developed in this fast moving technical age, will be likely candidates to be included in the transport mechanism in the place of floppy magnetic disks that have been used for purposes of the present illustration. For example, as the technology becomes available, the use of video disks that can be either read by a computer or both read and revised with new material.

Although the invention has been described in connection with a preferred embodiment and certain alternatives, other alternatives, modifications, and variations may be apparent to those skilled in the art in view of the foregoing description. Accordingly, it is intended to embrace all such alternatives, modifications, and variations as fall within the spirit and scope of the appended claims.

What is claimed is:

1. An information storage and retrieval system comprising:
    a plurality of tangible media of different thicknesses and shapes for embodying stored information;
    a storage section for receiving and holding each of said different tangible medium;
    a transducer for transferring information with respect to said tangible medium when said medium is in an information transferring position in said transducer;
    a single transport mechanism movable to and from the storage section and movable to and from said transducer for transporting said tangible medium from said storage section to said transducer and from said transducer to said storage section;
    means on said transport mechanism for retrieving said tangible medium from one of said storage section and said transducer at a time and alternately placing or replacing said tangible medium therein, said means being in the form of a clamping device capable of both grabbing and removing said tangible medium of different thicknesses and shapes from either said transducer or said storage section and including a pair of opposing clamping members and means for both separating and closing said members to grab, retain and release said tangible medium;
    said clamping members being on said single transport mechanism and movable to achieve the transport between the storage section and the transducer;
    control means for controlling both said transport mechanism and said retrieving, placing and replacing means; and
    computer means for controlling said control means.

2. A system in accordance with claim 1 wherein said storage section and said transducer are disposed relative to one another generally on the same level and wherein said transport mechanism moves in a horizontal path from one to the other.

3. A system in accordance with claim 1 wherein said storage section and said transducer are disposed relative to one another generally in a common vertical plane, one being directly overhead of the other, and wherein said transport mechanism moves at least in a vertical path from one to the other.

4. A system in accordance with claim 1 wherein said storage section and said transducer are disposed relative to one another generally in a common vertical plane, one being overhead of but spaced to one side of a vertical line extending through the other, and wherein said transport mechanism moves at least in both a vertical path and a horizontal path from one to the other.

5. A system in accordance with claim 1 wherein said storage section and said transducer are disposed relative to one another such that one is spaced to one side of a laterally extending plane containing the other and to one side of a front-to-rear extending plane containing the other, and wherein said transport mechanism moves at least horizontally both laterally and front-to-rear from one to the other.

6. A system in accordance with claim 5 wherein said storage section and said transducer are disposed relative to one another such that one is also spaced above or below a horizontal plane containing the other, and wherein said transport mechanism also moves angularly with respect to the horizontal.

7. A system in accordance with claim 1 wherein said storage section is in the form of a rack provided with means for holding one or more of said tangible medium in a stored condition.

8. A system in accordance with claim 1 wherein said storage section is in the form of a plurality of racks stacked in a vertical plane, each provided with means for holding one or more of said tangible medium in a stored condition.

9. A system in accordance with claim 1 wherein said storage section is in the form of a plurality of racks disposed axially at least partly around a cylinder of reference with input sides substantially tangent to the surface of the cylinder so as to form at least a portion of a polygon in cross section, each said structure being provided with means for holding one or a quantity of said tangible medium in a stored condition.

10. A system in accordance with claim 7, 8 or 9 wherein said tangible medium is a jacketed disk assembly and said transducer is a disk drive for such disk assemblies.

11. A system in accordance with claim 7, 8 or 9 wherein said tangible medium is a disk cartridge and said transducer is a drive for such cartridges.

12. A system in accordance with claim 7, 8 or 9 wherein said tangible medium is in the form of a circular disk and said transducer is a drive for such circular disks.

13. A system in accordance with claim 12 wherein said circular disk is a video disk.

14. A system in accordance with claim 7, 8 or 9 wherein said storage section stores a mixture of tangible media in the form of jacketed disk assemblies, disk cartridges, and circular disks and said transducer comprises a drive for the disk assemblies, a drive for the cartridges, and a drive for the circular disks, said computer causing the disk assemblies to be transported to the drive receiving the disk assemblies, the disk cartridges to be transported to the drive receiving the disk cartridges, and the circular disks to the drive receiving the circular disks.

15. A system in accordance with claim 1 wherein said transport mechanism comprises a longitudinally extending pair of guide rods, a lead screw extending parallel to the guide rods and a carriage slideably mounted on said rods for translation therealong by the rotation of said lead screw.

16. A system in accordance with claim 15 wherein said carriage includes said means on said transport mechanism for retrieving, placing and replacing said tangible medium, said means being in the form of a holding arm and said grab and hold device carried by a transverse carriage for in and out movements in a direction transverse to said lead screw.

17. A system in accordance with claim 16 wherein said transverse carriage is moved in and out by a rack and gear combination.

18. A system in accordance with claim 15 wherein said rods and lead screw extend horizontally and provide horizontal movement of said carriage and wherein said carriage further provides a base for a pair of vertically extending guide rods, a lead screw extending parallel to the guide rods and a further carriage slideably mounted on said vertical rods and vertically translated therealong by the rotation of said vertically extending lead screw, whereby said further carriage is capable of being moved both vertically and horizontally.

19. A system in accordance with claim 18 wherein said further carriage includes said means on said transport mechanism for retrieving, placing and replacing said tangible medium, said means being in the form of a holding arm and said grab and hold device carried by a transverse carriage for in and out movement in a direction transverse to said vertical lead screw.

20. A system in accordance with claim 19 wherein said transverse carriage is moved in and out by a rack and gear combination.

21. A system in accordance with claim 15, 16, 17, 18, 19 or 20 further comprising a stepper motor causing rotation of each said lead screw.

22. A system in accordance with claim 9 wherein said cylinder of reference defines an axial corridor and wherein said transport mechanism comprises an axially extending pair of guide rods in said corridor, a lead screw extending parallel to the guide rods, said lead screw being coaxial with said cylinder of reference, and a carriage slideably mounted on said rods for translation therealong by the rotation of said lead screw.

23. A system in accordance with claim 22 wherein said carriage includes said means on said transport mechanism for retrieving, placing and replacing said tangible medium, said means being in the form of a holding arm and said grab and hold device carried by a transverse carriage for in and out movements in a direction transverse to said lead screw and further comprising means for rotating the combination of said guide rods and said lead screw along with the carriage mounted thereon about the axis of said cylinder of reference providing pre-positioning for said retrieving, placing and replacing means with respect to any of said racks disposed axially at least partly around the surface of said cylinder of reference.

24. A system in accordance with claim 23 further comprising a stepper motor each for rotating said axially extending lead screw and for controlling said means for rotating the combination of said guide rods, lead screw and carriage.

25. A system in accordance with claim 8 or 9 further comprising an outer frame structure containing and supporting said storage section and wherein said transducer is mounted internally of said frame structure providing a combined storage and staging unit.

26. A system in accordance with claim 8 or 9 further comprising an outer frame structure containing and supporting said storage section and wherein means are provided for extending said transport mechanism to an adjacent external position where said transducer is located, thus providing a storage unit capable of interfacing with a separate staging unit.

27. A system in accordance with claim 7, 8 or 9 wherein said storage section comprises a plurality of fixed storage spaces for storing a plurality of more than one kind of tangible medium and further comprising a program in said computer means in conjunction therewith for determining the distance and direction said transport mechanism must move to retrieve, place or replace a given unit of a tangible medium and transport it from one of said storage section and said tranducer to the other.

28. A system in accordance with claim 1 wherein said device capable of both grabbing and removing said tangible medium, which includes a pair of opposing members and means for alternately separating and closing said members, comprises solenoid means having a plunger providing to-and-fro movements, and spring means urging said members in the closed position, the to-and-fro movements respectively causing separation of the members against the urging of said spring means and permitting the closing of the members under the urging of the spring means.

29. An information storage and retrieval system comprising:
a plurality of tangible medium of different thicknesses and shapes for embodying stored information;
a storage section for receiving and holding each of said different tangible medium;
a transducer for transferring information with respect to said tangible medium when said medium is in an information transferring position in said transducer;
a single transport mechanism movable to and from the storage section and movable to and from said transducer for transporting said tangible medium from said storage section to said transducer and from said transducer to said storage section, said storage section and said transducer being disposed relative to one another generally in a common vertical plane, one being overhead of but spaced to one side of a vertical line extending through the other, said transport mechanism moving at least in both a vertical path and a horizontal path from one to the other;

means on said transport mechanism for retrieving said tangible medium from one of said storage section and said transducer at a time and alternately placing or replacing said tangible medium therein said means being in the form of a clamping device capable of both grabbing and removing said tangible medium from either said transducer on said storage section and including a pair of clamping opposing members and means for both separating and closing said members to grab, retain and release said tangible medium;

said clamping members being on said single transducer mechanism and movable to achieve the transport between the storage section and the transducer;

control means for controlling both said transport mechanism and said retrieving, placing and replacing means; and computer means for controlling said control means.

30. A system in accordance with claim 29 wherein more than one tangible medium is included comprising a combination of jacketed disk assemblies, disk cartridges, and circular disks and wherein said transducer includes a plurality of drives, one for each medium.

31. A system in accordance with claim 29 wherein said device capable of both grabbing and removing said tangible medium, which includes a pair of opposing members and means for alternately separating and closing said members, comprises solenoid means having a plunger providing to-and-fro movements, and spring means urging said members in the closed position, the to-and-fro movements respectively causing separation of the members against the urging of said spring means and permitting the closing of the members under the urging of the spring means.

32. A method for storing and retrieving information, comprising:

providing a plurality tangible medium of different sizes and shapes for embodying stored information;

providing a storage section for receiving and holding said tangible medium;

providing a transducer for transferring information with respect to said tangible medium when said medium is in an information transferring position in said transducer;

providing a single transport mechanism for moving to and from the storage section and moving to and from the transducer and for transporting said tangible medium from one of said storage section and said transducer to the other;

providing means on said transport mechanism for retrieving said tangible medium from one of said storage section and said transducer at a time and alternately placing or replacing said tangible medium therein said means being in the form of a clamping device capable of both grabbing and removing said tangible medium from either said transducer on said storage section and including a pair of opposing clamping members and means for both separating and closing said members to grab, retain and release said tangible medium;

said clamping members being on said single transport mechanism and movable to achieve the transport between the storage section and the transducer;

providing control means for controlling both said transport mechanism and said, placing and replacing means; and providing computer means for controlling said control means, said computer means including a computer-controlled method for controlling said control means comprising:

determining whether the medium is to be retrieved, placed or replaced;

calculating the direction and distance said transport mechanism must move to arrive at location where medium is to be retrieved, placed or replaced;

initiating signal for causing said transport mechanism to move to said location;

initiating signal for causing said means on said transport mechanism to retrieve, place or replace said medium;

reiterating the above steps under the control of said computer until a desired complete routine relative to said medium is achieved.

33. A method in accordance with claim 32 wherein the computer-controlled method for retrieving said medium comprises:

initiating a motor movement routine with the medium location as destination;

initiating a medium grab and insert routine to lay hold of the medium;

initiating a motor movement routine with the transducer as destination;

initiating action for the transducer to receive said medium; and initiating a medium grab and insert routine to insert the medium in the transducer.

34. A method in accordance with claim 32 wherein the computer-controlled method for replacing said medium comprises:

initiating action to locate said transport mechanism in front of said transducer;

initiating action for the transducer to release said medium;

initiating a medium grab and insert routine to lay hold of the medium;

initiating a motor movement routine with the medium storage location as destination; and initiating a medium grab and insert routine to insert the medium.

35. A method in accordance with claim 33 or 34 wherein the computer-controlled method for motor movement routine comprises:

calculating the direction and number of steps needed to get to destination;

initiating a signal to activate motor; and canvassing the number of steps taken until destination is achieved.

36. A method in accordance with claim 33 or 34 wherein the computer-controlled method for grab and insert of said medium comprises:

initiating action for means on said transport mechanism for retrieving said tangible medium to advance towards said medium;

on a grab instruction, initiate a signal to close grabber after contact with medium;

on insert instruction, initiate a signal to release grabber after insertion of said medium; and initiating action to reverse movement of said means on said transport mechanism.

37. A method in accordance with claim 32 wherein said device capable of both grabbing and removing said tangible medium, which includes a pair of opposing members and means for alternately separating and closing said members, comprises solenoid means having a plunger providing to-and-fro movements, and spring means urging said members in the closed position, the to-and-fro movements respectively causing separation of the members against the urging of said spring means and permitting the closing of the members under the urging of the spring means.

* * * * *